United States Patent
Fujii et al.

(10) Patent No.: US 7,927,029 B2
(45) Date of Patent: Apr. 19, 2011

(54) IMAGING APPARATUS AND OPEN/CLOSE DEVICE

(75) Inventors: Hiroshi Fujii, Tokyo (JP); Yoshio Kusui, Kanagawa (JP); Mitsuru Harada, Kanagawa (JP); Yutaka Saito, Tokyo (JP); Masahiko Noro, Kanagawa (JP)

(73) Assignee: Sony Corporation, Tokyo (JP)

( * ) Notice: Subject to any disclaimer, the term of this patent is extended or adjusted under 35 U.S.C. 154(b) by 173 days.

(21) Appl. No.: 12/292,409

(22) Filed: Nov. 19, 2008

(65) Prior Publication Data
US 2009/0169197 A1    Jul. 2, 2009

(30) Foreign Application Priority Data

Dec. 28, 2007   (JP) .................................. 2007-339316

(51) Int. Cl.
*G03B 17/00*    (2006.01)
(52) U.S. Cl. ...................................................... 396/448
(58) Field of Classification Search .................. 396/448; 359/511
See application file for complete search history.

(56) References Cited

U.S. PATENT DOCUMENTS

| | | | | |
|---|---|---|---|---|
| 5,737,658 A | * | 4/1998 | Arai | 396/448 |
| 5,740,480 A | | 4/1998 | Kuhn, Jr. et al. | |
| 5,913,089 A | * | 6/1999 | Ebe | 396/448 |
| 6,799,905 B2 | * | 10/2004 | Suzuki | 396/448 |
| 2007/0047951 A1 | * | 3/2007 | Tanaka et al. | 396/448 |

FOREIGN PATENT DOCUMENTS

| | | |
|---|---|---|
| JP | 61-89823 A | 6/1986 |
| JP | 2544329 A | 10/1996 |
| JP | 2593878 A | 3/1997 |
| JP | 09-163199 | 6/1997 |
| JP | 10-232427 A | 9/1998 |
| JP | 2005-077574 | 3/2005 |
| JP | 2005-308898 A | 11/2005 |

OTHER PUBLICATIONS

Japanese Office Action & English Translation issued Oct. 6, 2009 for corresponding Japanese Application No. 2007-339316.

* cited by examiner

*Primary Examiner* — W. B. Perkey
(74) *Attorney, Agent, or Firm* — Rader, Fishman & Grauer PLLC

(57) ABSTRACT

An imaging apparatus include a lens, a first blade slidable between a covering position where the first blade covers the front side of the lens and a retract position where the first blade retracts from the front side of the lens, and a second blade pivotally supported by the first blade, the second blade moving along with the first blade between the covering position and the retract position in response to the slide motion of the first blade, the second blade rotating relative to the first blade in such a way that the second blade more largely overlaps with the first blade in the retract position than in the covering position.

11 Claims, 29 Drawing Sheets

FIG. 15
(a)   (b)
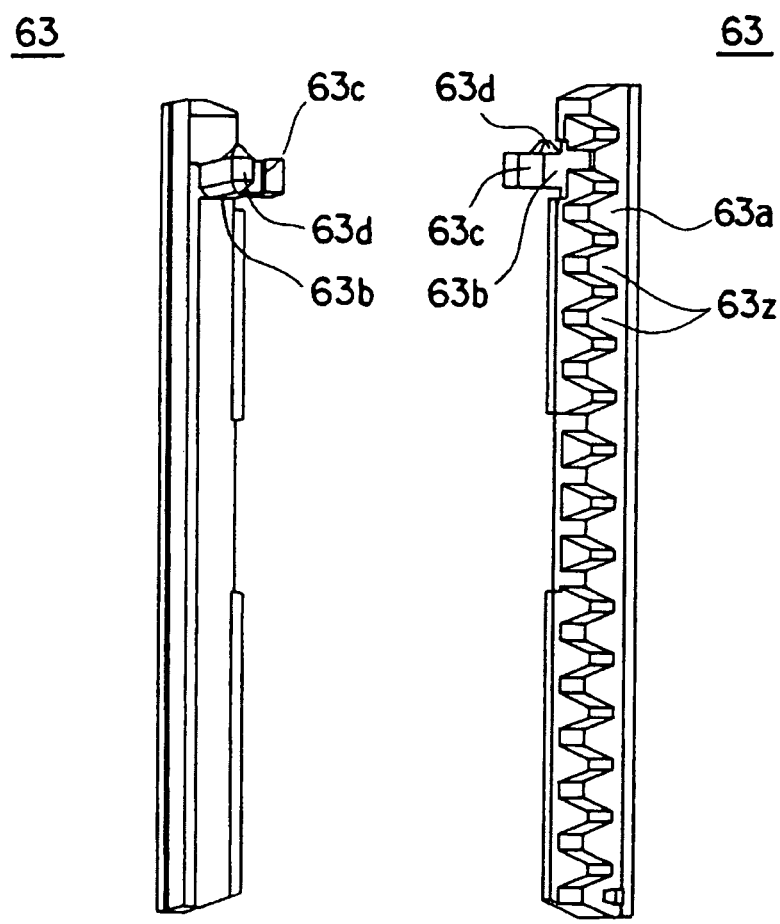
(c)
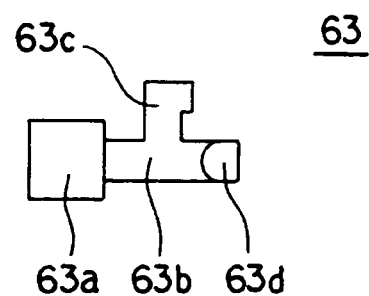

IMAGING APPARATUS AND OPEN/CLOSE DEVICE

CROSS REFERENCES TO RELATED APPLICATIONS

The present invention contains subject matter related to Japanese Patent Application JP 2007-339316 filed in the Japanese Patent Office on Dec. 28, 2007, the entire contents of which being incorporated herein by reference.

BACKGROUND OF THE INVENTION

1. Field of the Invention

The present invention relates to an imaging apparatus and an open/close device.

2. Description of the Related Art

There is a technology for providing openable/closable blades, for example, to protect a lens in a video camera or other imaging apparatus. For example, the video camera described in JP-A-2005-77574 has a lens barrier including a single blade that linearly slides between a position where the blade covers a lens and a position where the blade retracts from the lens. The video camera described in JP-A-2005-308898 has a lens barrier including a driving blade pivotally supported by a housing or other members and a driven blade pivotally supported by the driving blade. The driving blade and the driven blade are unfolded and cover a lens. When the driving blade rotates and retracts from the lens, the driven blade rotates relative to the driving blade, overlaps therewith, and is accommodated along with the driving blade in an area that does not overlap with the lens.

SUMMARY OF THE INVENTION

In the technology described in JP-A-2005-77574, since a single blade slides, a blade accommodating space needs to have a size comparable to the size of the blade. As a result, for example, it is necessary to provide a blade accommodating space that is adjacent to a lens barrel and has a size comparable to the size of the lens barrel. In this case, compact size, lightweight, and exterior appearance will be limited. For example, the housing adjacent to the lens barrel may not be designed to be smaller than the lens barrel.

In the technology described in JP-A-2005-308898, since the driving blade is pivotally supported, it is difficult to achieve compact size and design freedom as compared to a case where a slidable blade is provided. For example, in addition to a space where the lens is disposed and a space where the driving blade is accommodated, it is necessary to provide a space where a pivotal point of the driving blade is provided. At the same time, such a space needs to be provided at a location along a line perpendicular to the direction in which the driving blade moves (circumferential direction).

Thus, it is desirable to provide an imaging apparatus and an open/close device that allow a space where a blade is accommodated to be smaller.

An imaging apparatus according to an embodiment of the invention includes a lens, a first blade slidable between a covering position where the first blade covers the front side of the lens and a retract position where the first blade retracts from the front side of the lens, and a second blade pivotally supported by the first blade, the second blade moving along with the first blade between the covering position and the retract position in response to the slide motion of the first blade, the second blade rotating relative to the first blade in such a way that the second blade more largely overlaps with the first blade in the retract position than in the covering position.

Preferably, the imaging apparatus further includes an urging member that urges the first and second blades in the direction in which the first and second blades are separated from each other, and an abutting portion that abuts the second blade in such a way that when the first and second blades move from the covering position to the retract position, the second blade rotates against the urging force of the urging member in the direction in which the second blade overlaps with the first blade.

Preferably, the first blade does not rotate but linearly slides between the covering position and the retract position.

Preferably, the imaging apparatus further includes a housing that houses the lens and the first and second blades. When viewed from the front of the lens, the housing includes a first configured portion that houses the lens, and a second configured portion adjacent to the first configured portion. The second configured portion has a width smaller than that of the first configured portion in the direction perpendicular to the direction in which the first and second configured portions are arranged, and the second configured portion is shifted toward one side in the perpendicular direction with respect to the lens. The first and second blades are configured in such a way that in the covering position, the first blade is positioned on the one side in the perpendicular direction and the second blade is positioned on the other side in the perpendicular direction, and when moving from the covering position to the retract position, the first and second blades move from the first configured portion side to the second configured portion side in such a way that the rotation of the second blade reduces the width of the first and second blades as a whole in the perpendicular direction on the one side.

Preferably, the imaging apparatus further includes another housing connected to the housing in such a way that the other housing can transit between a closed state in which the other housing is overlaid on the surface of the second configured portion that is located on the other side and an open state in which the other housing moves away from the second configured portion. The housing and the other housing are configured in such a way that in the closed state, the first and second configured portions form on the one side a flat surface parallel to the arrangement direction, whereas the first configured portion and the other housing form on the other side a flat surface parallel to the arrangement direction.

Preferably, the portion of the first blade that covers the front side of the lens is formed in such a way that, when viewed from the front of the lens, the width closer to the second configured portion in the perpendicular direction becomes smaller on the one side. In the retract position, part of the portion on the wider side is accommodated in the first configured portion and part of the portion on the narrower side is accommodated in the second configured portion. The portion of the second blade that covers the front side of the lens is formed in such a way that, when viewed from the front of the lens, the width closer to the first configured portion in the perpendicular direction becomes smaller on the other side. When moving from the covering position to the retract position, the portion rotates around a point located on the second configured portion side toward the one side.

Preferably, the imaging apparatus further includes a drive power source, a driven member that is driven by the power of the drive power source, and an elastic member that connects the driven member to the first blade.

Preferably, the imaging apparatus further includes a drive power source, and a first gear and a second gear that can engage each other and transmit the power of the drive power source to the first blade. At least one of the first and second gears has a non-tooth portion so that the first and second gears disengage from each other when the first blade is positioned in at least one of the covering position and the retract position. Of the first and second gears, the gear on the drive power source side has a cam portion that protrudes outward in the radial direction and extends over the range in which the non-tooth portion is disposed in the circumferential direction. Of the first and second gears, the gear on the first blade side has a locking portion that is slidably locked in the circumferential direction on the surface of the cam portion along the circumferential direction so as to restrict the gear from rotating.

An open/close device according to another embodiment of the invention includes a first blade slidable between a closed position and an open position, and a second blade pivotally supported by the first blade, the second blade moving along with the first blade between the closed position and the open position in response to the slide motion of the first blade, the second blade rotating relative to the first blade in such a way that the second blade more largely overlaps with the first blade in the open position than in the closed position.

According to the embodiments of the invention, a blade-accommodating space can be reduced.

BRIEF DESCRIPTION OF THE DRAWINGS

FIG. 15 shows a rack gear that drives the driving blade shown in FIG. 12;

DESCRIPTION OF THE PREFERRED EMBODIMENTS

Figure 1A:
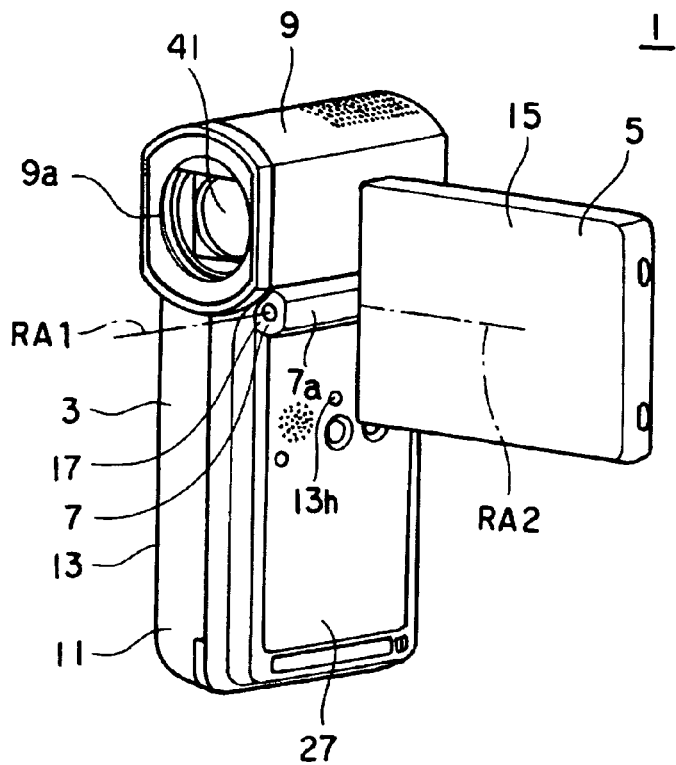
FIGS. 1A and 1B are perspective views showing exterior appearance of a video camera according to an embodiment of the invention.
Figure 1B:
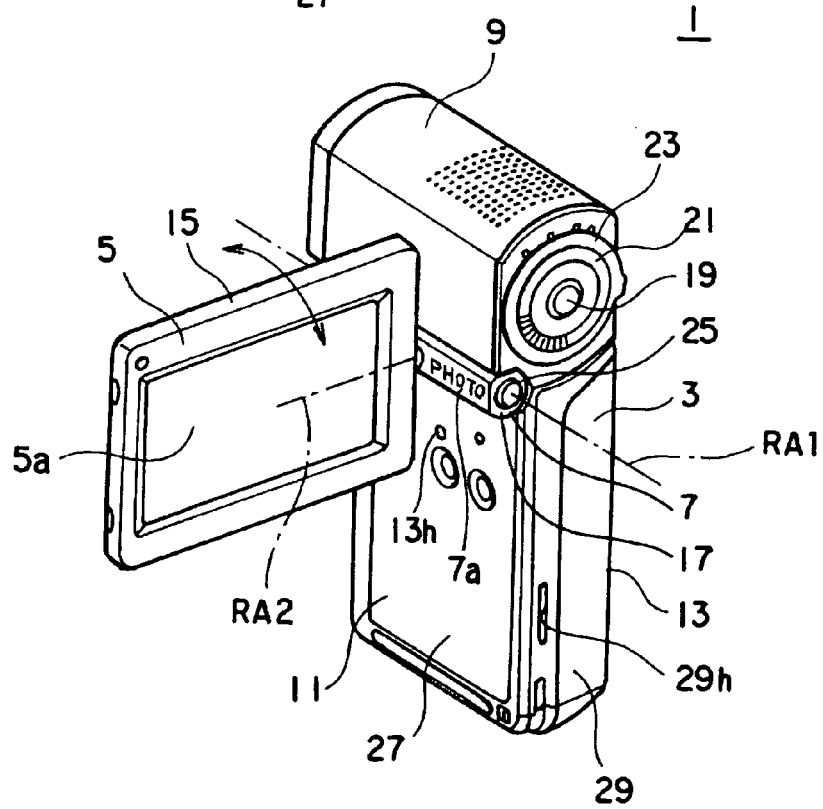
Figure 2A:
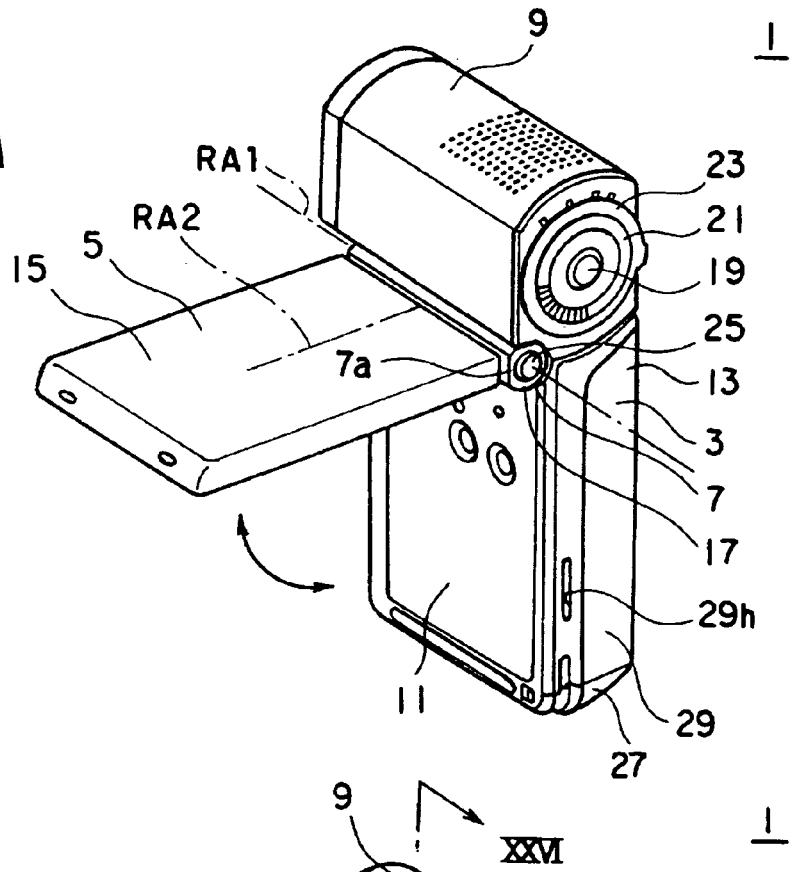
FIGS. 2A and 2B are perspective views showing exterior appearance of the video camera shown in FIGS. 1A and 1B in a state different from the state in FIGS. 1A and 1B.
Figure 2B:
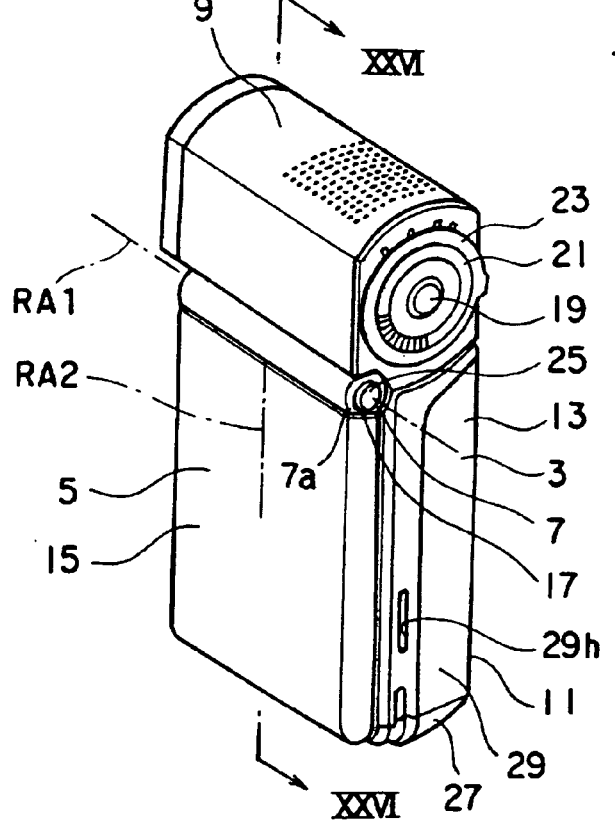
Figure 3:
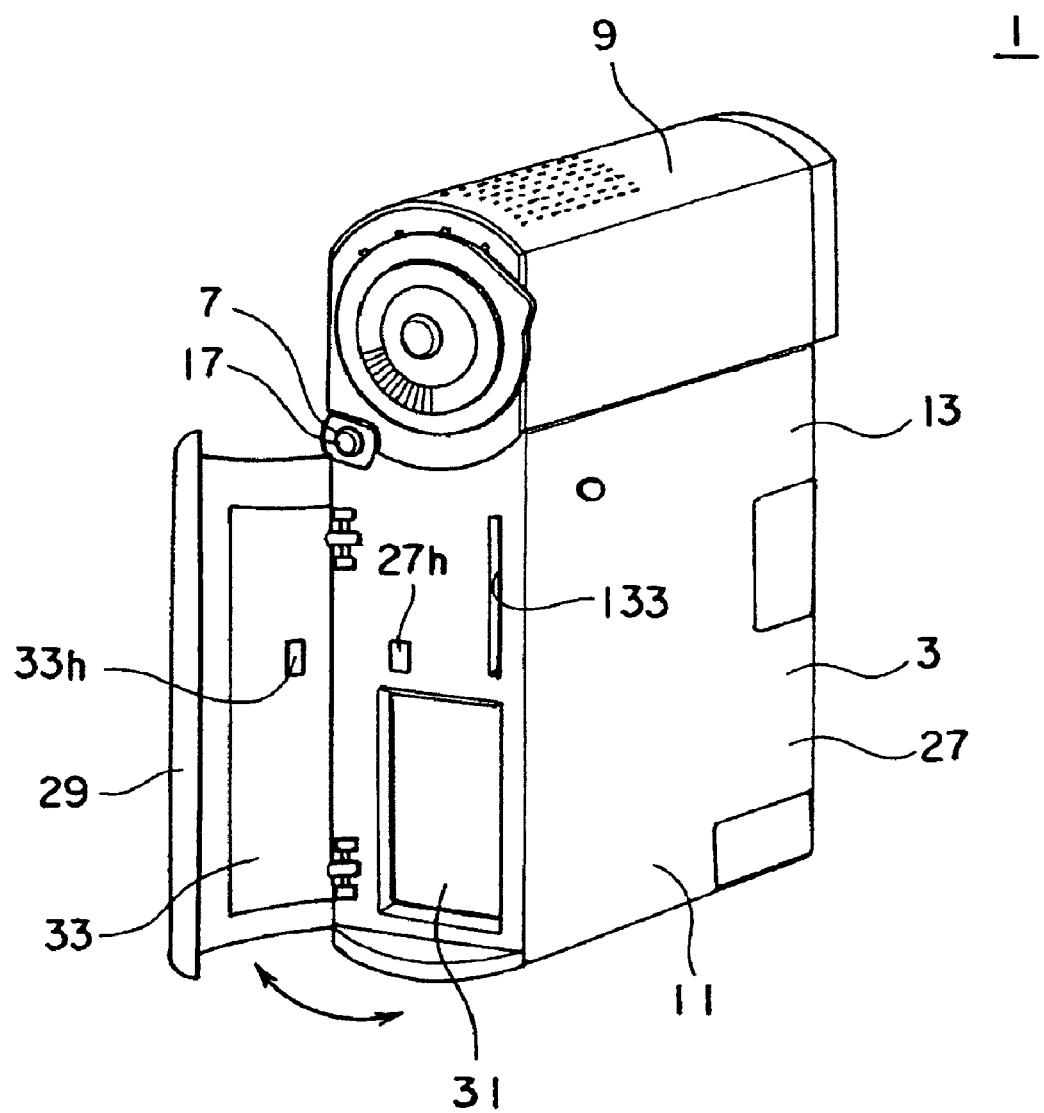
FIG. 3 is a perspective view showing exterior appearance of the video camera shown in FIGS. 1A and 1B in a state different from the states in FIGS. 1A, 1B, 2A, and 2B.

FIGS. 1A and 1B to 3 are perspective views showing exterior appearance of a video camera 1 as an electronic apparatus or an imaging apparatus according to an embodiment of the invention. Specifically, FIG. 1A is a perspective view of the video camera 1 in use when viewed from the front side (subject side). FIG. 1B is a perspective view of the video camera 1 in use when viewed from the rear side (camera operator side in a basic usage mode). FIG. 2A is a perspective view of the video camera 1 in a transition state (a state between a used state and an accommodated state, which will be described later) when viewed from the rear side. FIG. 2B is a perspective view of the video camera 1 in the accommodated state when viewed from the rear side. FIG. 3 is a perspective view of the video camera 1 in the accommodated state with a battery lid open when viewed from the rear side.

The configuration of the video camera 1 is based on, as a basic usage mode, that a camera operator, for example, grips the video camera 1 by the right hand when using it with the upward direction in the plane of view of FIGS. 1A and 1B to 3 being the actual upward direction. In the following description, the upward and downward sides in the plane of view of FIGS. 1A and 1B to 3, and the subject side and the side opposite the subject side may be called upward, downward, frontward (front side), and rearward (rear side) of the video camera 1, respectively. Further, the up-down direction in the plane of view of FIGS. 1A and 1B to 3, the front-to-rear direction (or the direction opposite thereto), and the right-left direction when viewed from a subject may be called the up-down direction, the front-rear direction, and the right-left direction of the video camera 1, respectively.

The video camera 1 includes a body section 3 that is gripped by the camera operator in the basic usage mode and performs imaging and other operations, a display section 5 that is movably connected to the body section 3 and displays images, such as images being captured and images recorded in the past, and a connecting section 7 that connects the display section 5 to the body section 3. The body section 3 includes a lens portion 9 that introduces light from a subject and performs other functions, and a grip portion 11 that is gripped by the camera operator in the basic usage mode and houses a circuit board and a battery. The grip portion 11 is sized to substantially fit in the hand of the camera operator.

As shown in FIG. 2B, when the video camera 1 is not used, the display section 5 of the video camera 1 is folded and overlaid on the body section 3. When the video camera 1 is used, as shown in FIG. 2A, the display section 5 is first rotated around a first axis of rotation RA1 and inversely stands on the body section 3. The display section 5 is then rotated around a second axis of rotation RA2, as shown in FIG. 1B. For example, the display section 5 can be rotated around the second axis of rotation RA2 over a 270-degree angular range from the position shown in FIG. 2A through the position shown in FIG. 1B to the position at which a screen 5a faces forward.

The video camera 1 includes a sensor 115 (see FIG. 29) that detects that the display section 5 transits, for example, from the state shown in FIG. 2B to the state shown in FIG. 2A. Based on the detection result obtained from the sensor, when the display section 5 transits from the state shown in FIG. 2A to the state shown in FIG. 2B, a power supply is turned off, whereas when the display section 5 transits from the state shown in FIG. 2B to the state shown in FIG. 2A, the power supply is turned on.

In the basic usage mode, the camera operator orients the screen 5a of the display section 5 toward the rear of the body section 3, as shown in FIGS. 1A and 1B. With the front side of the body section 3 facing a subject, the rear side of the body section 3 facing the camera operator, and the grip portion 11 gripped by the right hand, the camera operator starts and stops recording while checking images displayed on the screen 5a. In this process, the inclination of the screen 5a (angle of rotation around the second axis of rotation RA2) is adjusted in accordance with the preference of the camera operator. In a usage mode in which the camera operator becomes a subject, so-called self-portraying, camera operator orients the screen 5a forward with respect to the body section 3. With the front side of the body section 3 oriented toward the camera operator, and an appropriate portion of the video camera 1 gripped by the camera operator, the camera operator starts and stops recording while checking images displayed on the screen 5a.

The video camera 1 can also be used only to reproduce images. The video camera 1 can also be used in such a way that the screen 5a is folded with the screen 5a exposed outward by first orienting the screen 5a upward (the state shown in FIG. 2A is changed to a state in which the display section 5 is rotated by 180 degrees around the second axis of rotation RA2) and then rotating the display section 5 around the first axis of rotation RA1 to overlay the display section 5 on the body section 3.

In the following description, states in which the display section 5 is overlaid on the body section 3 (the state shown in FIG. 2B, for example) are called closed states, and states in which the display section 5 inversely stands on the body section 3 (the states shown in FIGS. 1A, 1B, and 2A) are called open states. Further, as shown in FIG. 2A, the state in which the display section 5 in the closed state has transited to the state in which the display section 5 inversely stands but the display section 5 is not rotated around the second axis of rotation RA2 is called an open but non-rotated state. On the other hand, states in which the display section 5 in the state shown in FIG. 2A has been rotated around the second axis of rotation RA2 (the state shown in FIGS. 1A and 1B, for example) are called open and rotated states. Of the closed states, as shown in FIG. 2B, the state in which the screen 5a faces the grip portion 11 is called an accommodated state.

The video camera 1 is configured, as shown in FIG. 2B, in such a way that the external shape as a whole is generally a box whose dimension in the right-left direction is thin. A specific description of the external shape follows:

The external shape of the body section 3 (a body housing 13 of the body section 3) is generally a thin box having a recess formed therein for accommodating the display section 5 and the connecting section 7. That is, the external shape of the body section 3 is formed in such a way that cross sections perpendicular to the front-rear direction of the video camera 1 have substantially the same shape along the front-rear direction. The external shape of the body section 3 when viewed from the front has a P-like shape because the lens portion 9 protrudes toward the display section 5.

The external shape of the connecting section 7 (connecting housing 17) is generally a column (tube) extending in the front-rear direction of the video camera 1 (the axial direction of the first axis of rotation RA1). The connecting section 7, for example, has a D-shaped cross section perpendicular to the front-rear direction. The connecting section 7 has a flat portion 7a that is perpendicular to the second axis of rotation RA2 and faces the display section 5. The connecting section 7 is positioned in the vicinity of the boundary between the lens portion 9 and the grip portion 11 of the body section 3, and accommodated at an end of the recess in the body section 3. The length of the connecting section 7 in the front-rear direction is comparable to the length of the display section 5 in the front-rear direction.

The external shape of the display section 5 (display housing 15) is generally a thin box. The display section 5 is connected to the connecting section 7 in such a way that an end of the display section 5 faces the flat portion 7a of the connecting section 7. The length of the display section 5 in the accommodated state (FIG. 2B) in the front-rear direction is substantially comparable to the length of the body section 3 in the front-rear direction, and the length of the display section 5 in the up-down direction is comparable to the length obtained by subtracting the width of the connecting section 7 in the up-down direction from the length of the recess in the body section 3 in the up-down direction.

The display section 5 and the connecting section 7 as a whole has a size substantially comparable to the size of the recess formed in the grip portion 11 of the body section 3. When the display section 5 and the connecting section 7 are accommodated in the recess, the video camera 1 has a substantially thin box-like shape in the accommodated state. In other words, when viewed from the front, the lens portion 9 and the grip portion 11 form a flat surface along the direction in which the lens portion 9 and the grip portion 11 are arranged (up-down direction), and the lens portion 9 and the display section 5 form another flat surface along the up-down direction. Exactly speaking, the upper and lower end surfaces and other surfaces of the video camera 1 are curved to form rounded shapes. That is, the lens portion 9, when viewed from the front, has arcuate upper and lower surfaces, and the grip portion 11, when viewed from the front, has an arcuate lower surface.

The housing of the video camera 1 is formed of the body housing 13, the display housing 15, and the connecting housing 17. Each of the housings has openings formed therein as appropriate, and a variety of operation members are exposed through the openings. A specific description of the operation members follows:

As shown in FIG. 1A, an opening 9a is formed in the front end of the lens portion 9, and a lens 41 that images a subject is exposed through the opening 9a. The lens 41 and the opening 9a are disposed, for example, substantially at the center of the lens portion 9 in the right-left and up-down directions. Therefore, the grip portion 11, which forms the recess that accommodates the display section 5 and has a width in the right-left direction smaller than that of the lens portion 9, is shifted with respect to the lens 41 toward the side opposite the display section 5.

As shown in FIG. 1B, a recording button 19, an annular zoom lever 21, and an annular changeover lever 23 are provided on the rear end of the lens portion 9. The recording button 19 is pressed to start and stop recording video images. The zoom lever 21 is operated to slide in the circumferential direction to specify a zoom-in or zoom-out factor. The changeover lever 23 is operated to slide in the circumferential direction to switch imaging modes. A release button 25 that is pressed to capture a still image is provided on the rear end of the connecting section 7. The camera operator, for example, can grip the grip portion 11 by the right hand and capture video images or a still image by using the thumb finger to operate the recording button 19, the zoom lever 21, the changeover lever 23, and the release button 25.

As shown in FIG. 1B, a mark formed of characters, figures, or the like (characters "PHOTO" are illustrated by way of example in the present embodiment) indicative of information (function, for example) on the release button 25 are provided on the flat portion 7a of the connecting section 7 on the release button 25 side. The characters "PHOTO" are provided, for example, by affixing a label, writing a mark with paint, or forming protrusions and depressions on the flat portion 7a. As shown in FIGS. 2A and 2B, the characters "PHOTO" are hidden behind the display section 5 and hence invisible in the states between the closed state and the open but non-rotated state. When the display section 5 is rotated around the second axis of rotation RA2 into the open and rotated state, the characters "PHOTO" are exposed and hence visible, as shown in FIG. 1B.

In general, the camera operator operates the release button 25 in the open and rotated state, and the characters "PHOTO" are visible in such a typical situation in which the release button 25 is used, otherwise the characters "PHOTO" are invisible. Further, as described above, when the video camera 1 is turned off in the state shown in FIG. 2B and hence the release button 25 is disabled, the characters "PHOTO" is invisible. The video camera 1 may also be configured in such a way that a still image is captured in response to the operation performed on the release button 25 only in the open and rotated state or in open and semi-rotated states in which the display section 5 is positioned within an angular range within which the characters "PHOTO" are exposed, whereas the operation performed on the release button 25 is ignored in other states.

In addition to the operation members described above, a variety of push buttons are disposed, for example, on the surface of the grip portion 11 on which the display section 5 is overlaid. This surface also has, for example, openings through which sound from a speaker (not shown) is emitted and a hole into which a pin or the like is inserted to reset the video camera 1. Openings through which sound is inputted to a microphone (not shown) are formed in the upper surface of the lens portion 9.

As shown in FIG. 3, the body housing 13 of the body section 3 includes a body housing main portion 27 that forms a large portion of the body housing 13 and a lid 29 openably and closably connected to the body housing main portion 27. Opening the lid 29 exposes a battery container to and from a battery 31 is attached and detached and a slot 133 into which a memory card 135 (see FIG. 29) is inserted.

The lid 29 is provided, for example, over a large portion of the rear end of the grip portion 11. The lid 29 is connected to the body housing main portion 27, for example, via a hinge member 33. The hinge member 33 is not only connected to the body housing main portion 27 rotatably around an axis of rotation extending in the up-down direction, but also connected to the lid 29 slidably in the horizontal direction along the lid 29.

To open the lid 29, the lid 29 is operated to slide relative to the hinge member 33 to the right in the plane of view of FIG. 3 to release a lock, and then the lid 29 along with the hinge member 33 is rotated relative to the body housing main portion 27. Conversely, to close the lid 29, the lid 29 along with the hinge member 33 is rotated relative to the body housing main portion 27, and then the lid 29 is operated to slide relative to the hinge member 33 to engage the lock.

The battery 31 is formed into a substantially box-like shape, and inserted and removed to and from the body housing main portion 27. The battery 31, for example, has a size comparable to the size of the grip portion 11 in the right-left and front-rear directions, and has a size approximately one-half the size of the grip portion 11 in the up-down direction. The battery 31 is disposed in a lower portion of the grip portion 11.

Figure 4:
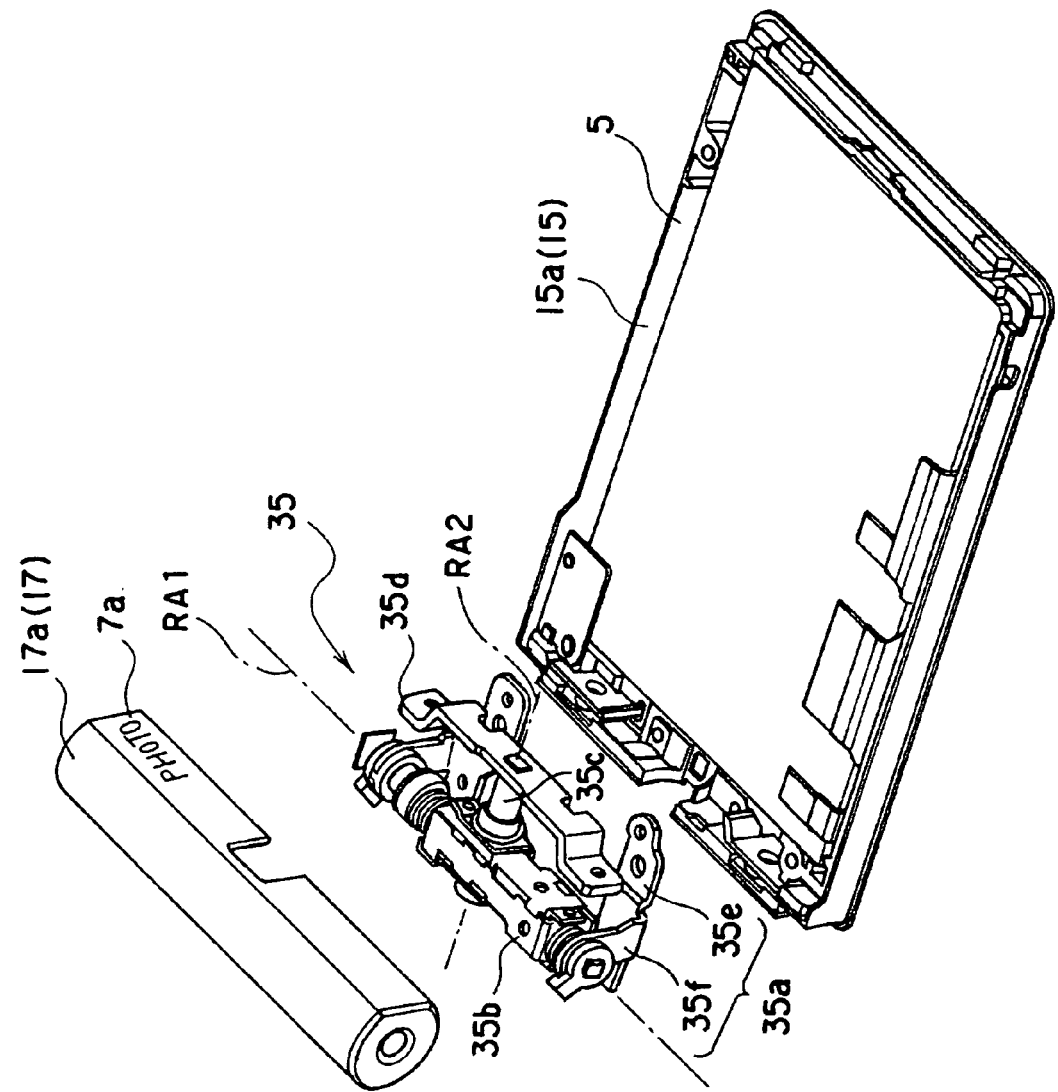
FIG. 4 is a view explaining an opening/closing and rotating mechanism of a display section of the video camera shown in FIGS. 1A and 1B.
Figure 5:
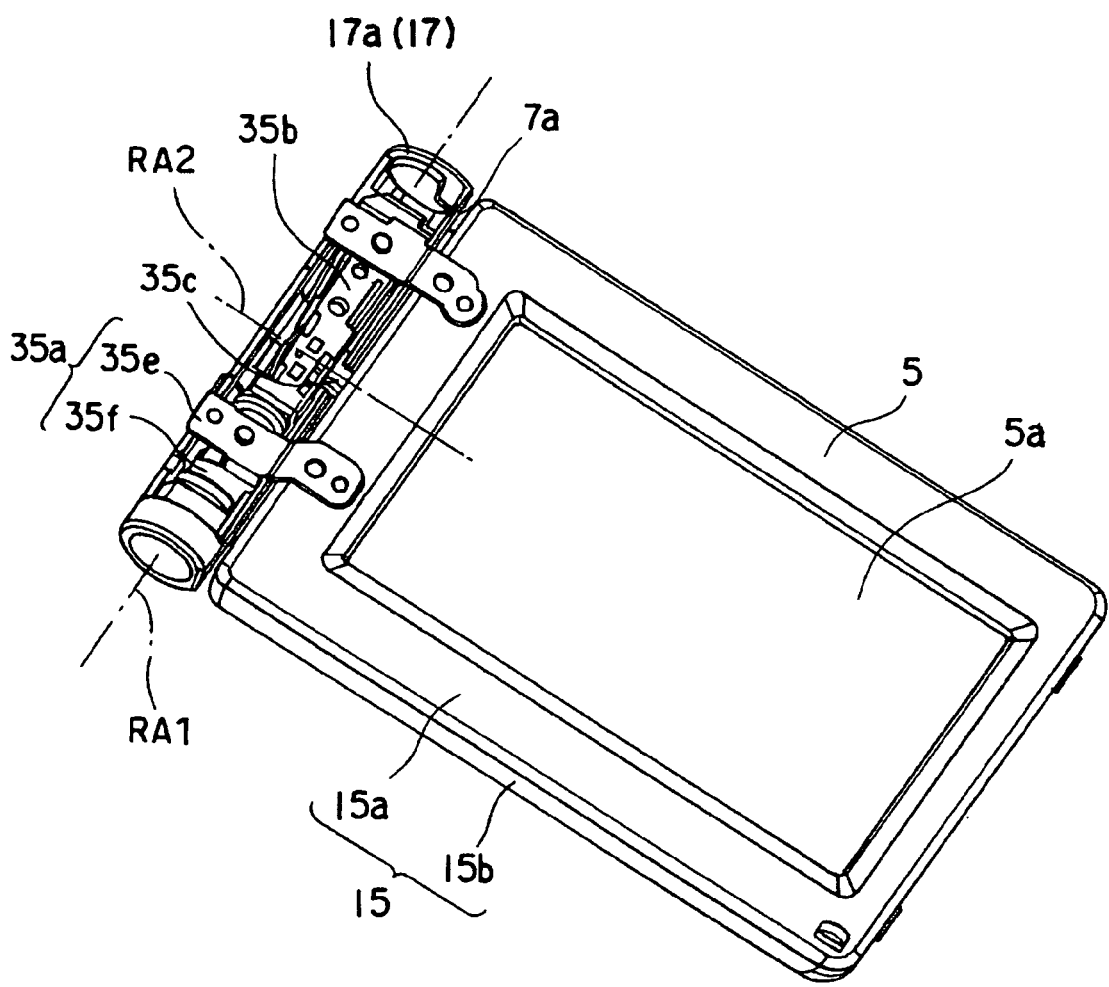
FIG. 5 is another view explaining the opening/closing and rotating mechanism of the display section of the video camera shown in FIGS. 1A and 1B.

FIGS. 4 and 5 are views explaining an opening/closing and rotating mechanism of the display section of the video camera 1. Specifically, FIG. 4 is an exploded perspective view, when viewed from the outside of the housing (the left side in the plane of view of FIG. 2B), showing part of the connecting section 7 and display section 5 in the accommodated state shown in FIG. 2B, and FIG. 5 is a perspective view, when viewed from the backside of the plane of view of FIG. 4, showing part of the connecting section 7 and display section 5 in a state in which the connecting section 7 and the display section 5 in the state in FIG. 4 are assembled.

The connecting section 7 includes a hinge mechanism 35 housed, for example, in the connecting housing 17 (FIGS. 4 and 5 only show a connecting hosing main portion 17a, which is part of the connecting housing 17). The hinge mechanism 35 includes two first hinge members 35a fixed to the body section 3, a second hinge member 35b connected to the first hinge members 35a to be rotatable around the first axis of rotation RA1, a third hinge member 35c connected to the second hinge members 35b to be rotatable around the second axis of rotation RA2, and a fourth hinge member 35d not only fixed to the third hinge member 35c but also fixed to the display section 5 (FIG. 4).

The first hinge member 35a has an L-shaped cross section when viewed in the up-down direction of the video camera 1 (the direction from the upper left toward the lower right in the plane of view of FIG. 4) and includes a fixing portion 35e and a protrusion 35f, the fixing portion 35e housed in the body housing 13 of the body section 3 and fixed to the body section 3, the protrusion 35f protruding from the body hosing 13. The fixing portion 35e has a plate shape that follows the surface of the body housing 13 on which the display section 5 is overlaid. The fixing portion 35e is fixed to the body housing 13 or other members fixed to the body housing 13 with screws or other fixing members. The protrusion 35f, for example, has a plate shape perpendicular to the first axis of rotation RA1.

The second hinge member 35b is, for example, formed of an elongated member extending in the axial direction of the first axis of rotation RA1. The second hinge member 35b is pivotally supported by the portions of the protrusions 35f of the first hinge members 35a that protrude from the body section 3. The first axis of rotation RA1 is thus positioned outside the body section 3.

The second hinge member 35b and part of the first hinge members 35a and third hinge member 35c are housed in the connecting housing 17. Since the first axis of rotation RA1 is positioned outside the body section 3, the connecting housing 17 can cover the second hinge member 35b and other members not only around the first axis of rotation RA1 but also in the axial direction thereof. That is, the connecting housing 17 can be formed to have ends through which the first axis of rotation RA1 passes, dispose the release button 25 exposed through one of the ends and a switch (not shown) pressed by the release button 25, and extend over the body section 3 in the right-left direction.

The third hinge member 35c, for example, has an elongated shape extending in the axial direction of the second axis of rotation RA2, protrudes from the connecting housing 17, and is inserted into the display housing 15 (the display housing 15 is formed of a front case 15a and a rear case 15b, and FIG. 4 shows only the front case 15a). That is, the third hinge member 35c extends from the first axis of rotation RA1 positioned outside the display housing 15 into the display housing 15, and allows the first axis of rotation RA1 to be positioned outside the display housing 15.

The fourth hinge member 35d has, for example, a plate-like shape that follows a surface facing the flat portion 7a of the connecting section 7. The fourth hinge member 35d is housed in the display housing 15 and fixed to the display housing 15 or other members fixed to the display housing 15 with screws or other fixing members.

The third hinge member 35c and the fourth hinge member 35d may be integrally formed. Further, the third hinge member 35c may be connected to the second hinge member 35b not to be rotatable around the second axis of rotation RA2 but connected to the fourth hinge member 35d (display housing 15) to be rotatable around the second axis of rotation RA2.

Figure 6A:
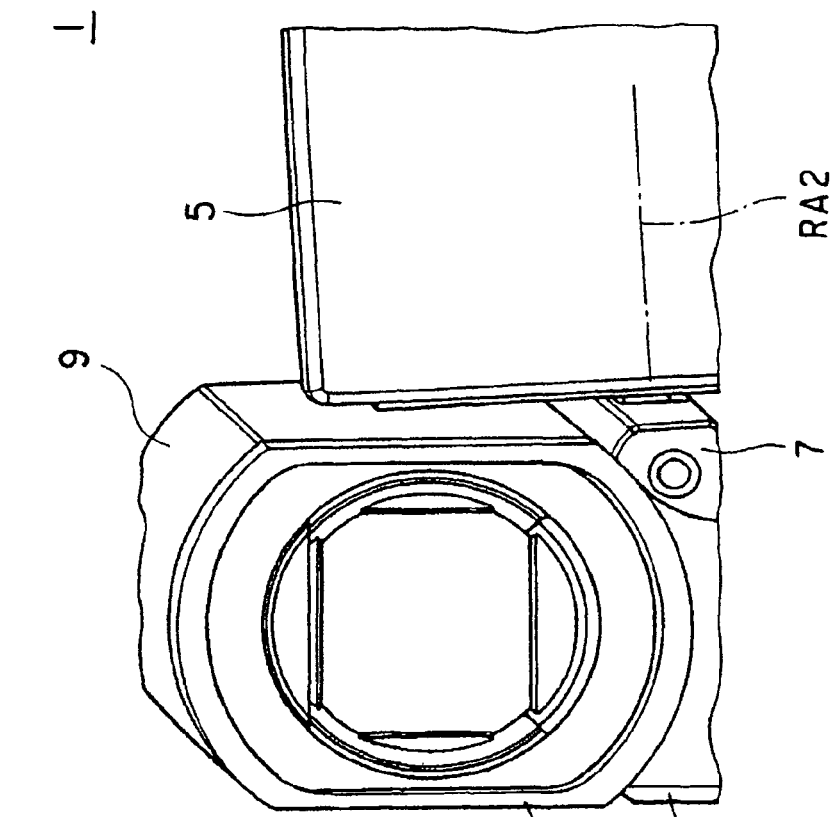
FIGS. 6A and 6B are views explaining abutment between housings in opening/closing and rotating operations in the display section of the video camera shown in FIGS. 1A and 1B.
Figure 6B:
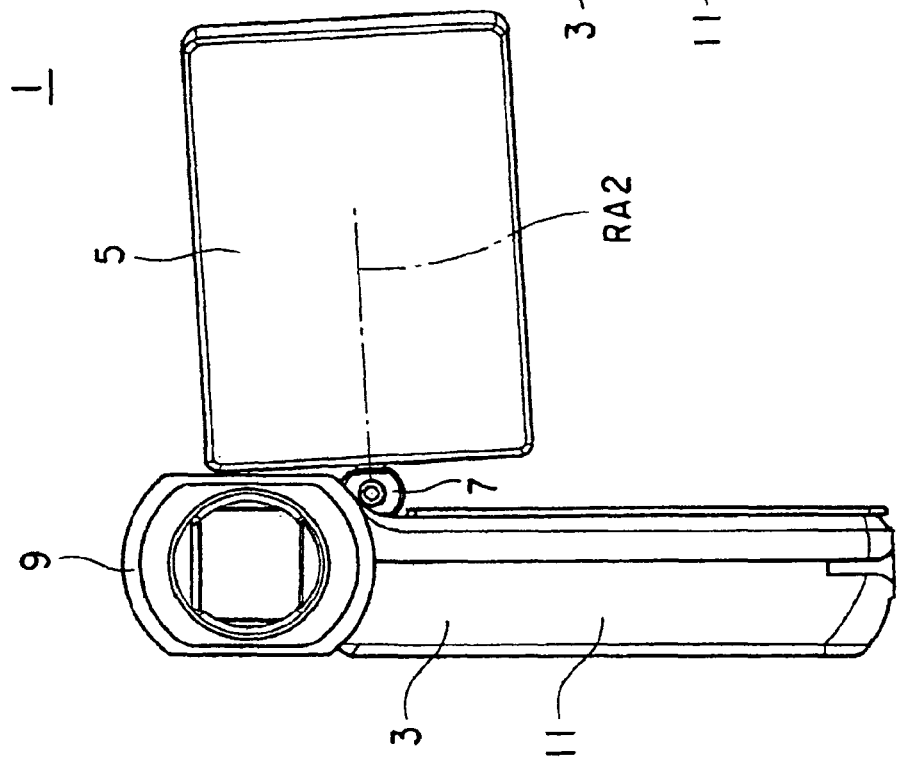

FIGS. 6a and 6B are views explaining abutment between housings in opening/closing and rotating operations in the video camera 1. FIG. 6A is a front view of the video camera 1, and FIG. 6B is a partial enlarged view of FIG. 6A.

Figure 7:
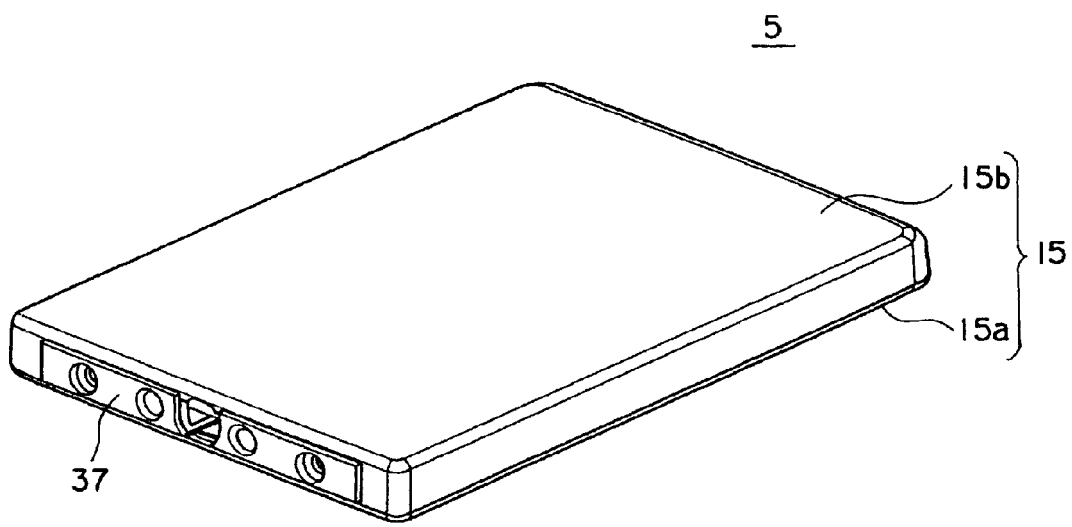
FIG. 7 is a perspective view of the display section of the video camera shown in FIGS. 1A and 1B when viewed from the side of the display section that is connected.

The connecting section 7 is designed in such a way that the display section 5 (second axis of rotation RA2) rotates in the direction in which the display section 5 opens only by 90 degrees from the closed position to the inversely standing position. However, in an actual product, the display section 5 moves in the direction in which the display section 5 opens slightly beyond the position that is 90 degrees apart from the closed position due to play resulting from tolerance and other factors. The display section 5 then abuts the side of the lens portion 9 in some cases, as shown in FIGS. 6A and 6B. In this case, when the display section 5 is rotated around the second axis of rotation RA2, the side of the lens portion 9 could be damaged. To address the problem, the video camera 1 has the following configuration:

FIG. 7 is a perspective view of the display section 5 viewed from the side thereof that is connected to the connecting section 7.

The display section 5 includes a protective member 37 on the end that faces the connecting section 7. The protective member 37 is made of a material whose hardness is lower than that of the portion of the body housing 13 that abuts the display section 5. For example, the lens portion 9 of the body housing 13 is made of a metal, whereas the protective member 37 is made of a resin.

The position where the protective member 37 is disposed and the thickness and other parameters thereof are determined as appropriate in such a way that when the display section 5 is rotated by an angle greater than a predefined angle (90 degrees), the protective member 37 can serve as a spacer between the lens portion 9 and the end of the display section 5 that faces the connecting section 7 (the protective member 37 can abut the lens portion 9 before the end of the display section abuts the lens portion 9). The protective member 37, for example, extends substantially along the end of the display section 5 and has an elongated shape having a size comparative to the size of that end. For example, the protective member 37 is fixed to the display housing 15 with screws, adhesive, or other fixing members, or fixed to the display housing 15 by sandwiching the protective member 37 between the front case 15a and the rear case 15b of the display housing 15.

Figure 8A:
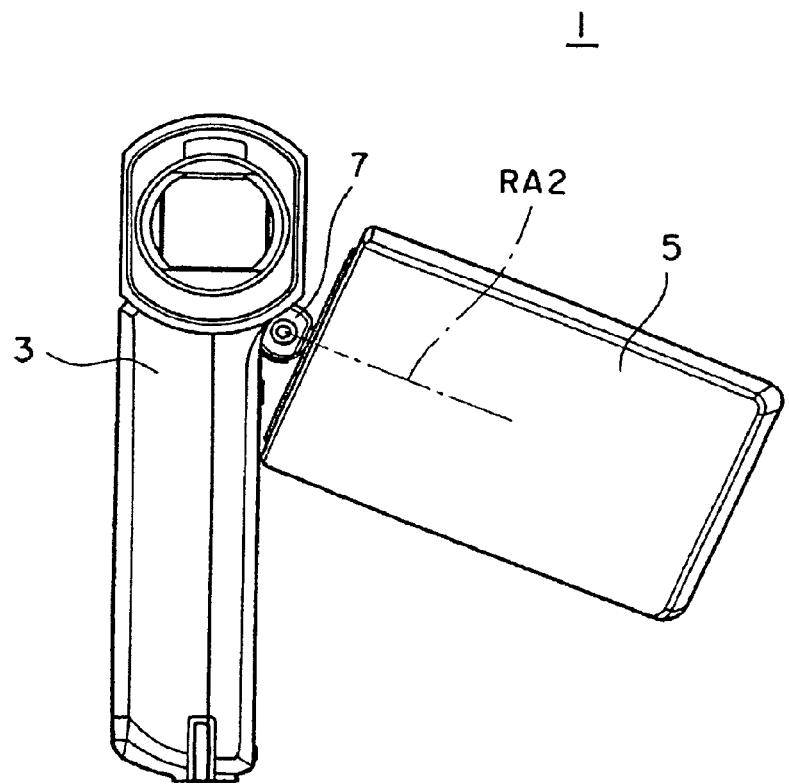
FIGS. 8A and 8B are other views explaining abutment between housings in opening/closing and rotating operations in the video camera shown in FIGS. 1A and 1B.
Figure 8B:
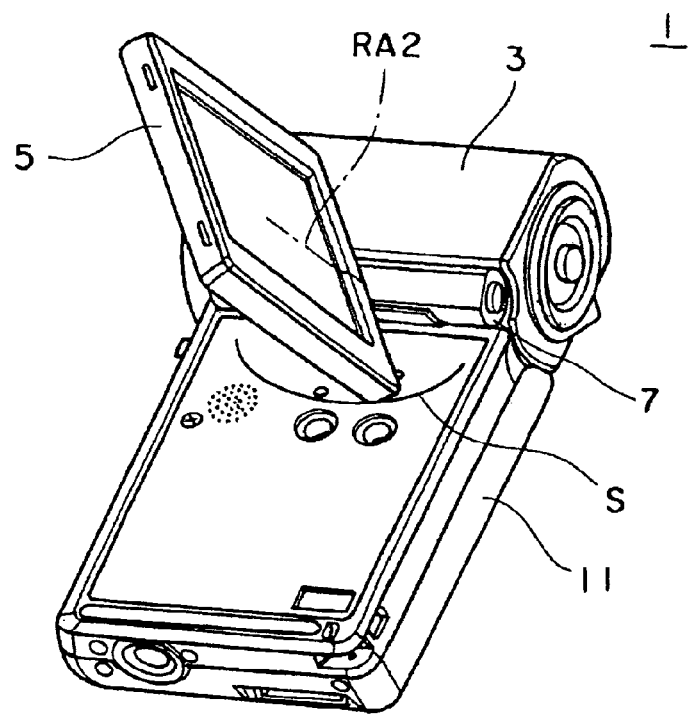

FIGS. 8A and 8B are other views explaining abutment between housings in opening/closing and rotating operations in the video camera 1. FIG. 8A is a front view of the video camera 1, and FIG. 8B is a perspective view of the video camera 1 viewed from the display section 5 side.

Figure 9A:
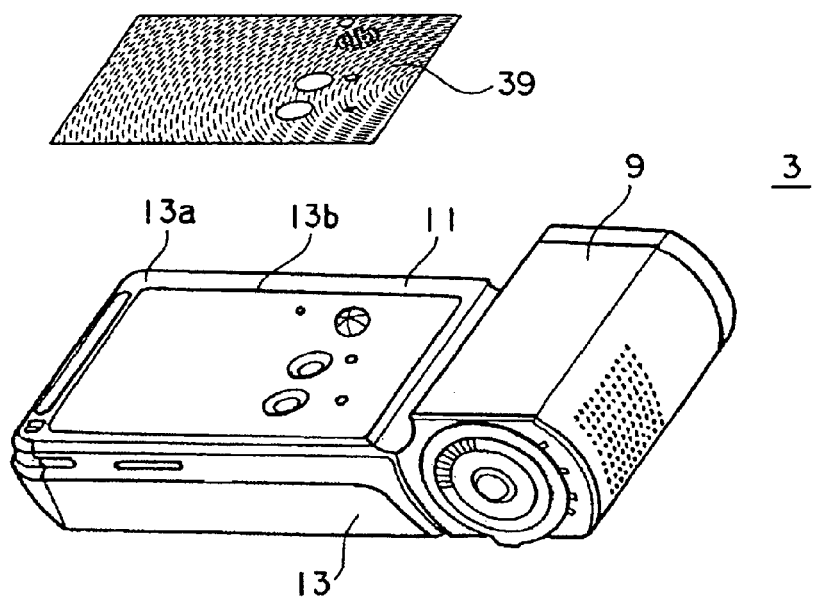
FIGS. 9A and 9B are views explaining the configuration of a surface on which the display section of the video camera shown in FIGS. 1A and 1B is overlaid.

The display section 5 can rotate around the second axis of rotation RA2 even in a transition state from the closed state to the open state. When the display section 5 is rotated around the second axis of rotation RA2 in a transition state, the display section 5 could abut the side of the grip portion 11 and produce a scratch S (FIG. 8B) on that side. The scratch S is an arcuate line centered around the second axis of rotation RA2. To address the problem, the video camera 1 has the following configuration:

FIG. 9A is a partial exploded perspective view of the body section 3. The body housing 13 of the body section 3 includes a housing forming portion 13a made of a metal, the housing forming portion 13a forming the surface of the grip portion 11 on which the display section 5 is overlaid. A decoration sheet 39 is fixed with an adhesive or the like to part of the surface (attachment area 13b) of the housing forming portion 13a on which the display section 5 is overlaid. The attachment area 13b, for example, takes up a large portion of the surface of the grip portion 11 on which the display section 5 is overlaid. The attachment area 13b is positioned with respect to the scratch S in such a way that the attachment area 13b overlaps with both the radially inner and outer areas of the scratch S.

Figure 9B:
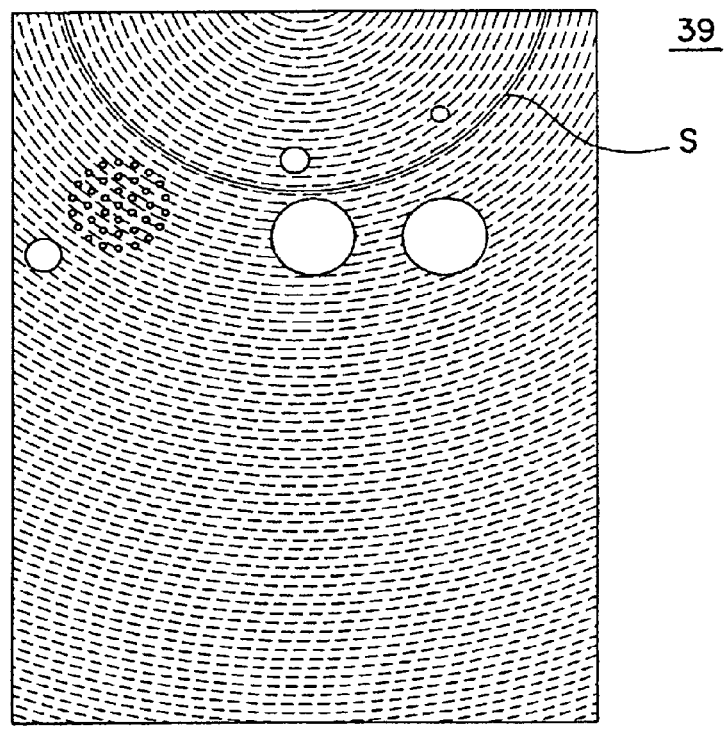

FIG. 9B is a plan view of the decoration sheet 39. The decoration sheet 39 is made of, for example, a resin. The decoration sheet 39 has a metallic spin pattern. The spin pattern is a pattern created when arcuate scratches (minute grooves) are produced in a metal surface. The spin pattern is not obtained by actually forming arcuate grooves in the decoration sheet 39, but by printing a spin pattern on the decoration sheet 39. The spin lines are centered around the second axis of rotation RA2. In other words, the spin lines are concentric with the scratch S.

Therefore, even when the scratch S is formed, the scratch S is not noticeable because the scratch S looks like one of the spin lines. A variety of operation members and openings provided in the surface of the grip portion 11 on which the display section 5 is overlaid are preferably disposed at locations where the scratch S is not formed (locations where the display section 5 abuts the surface of the grip portion 11 on which the display section 5).

Figure 10:
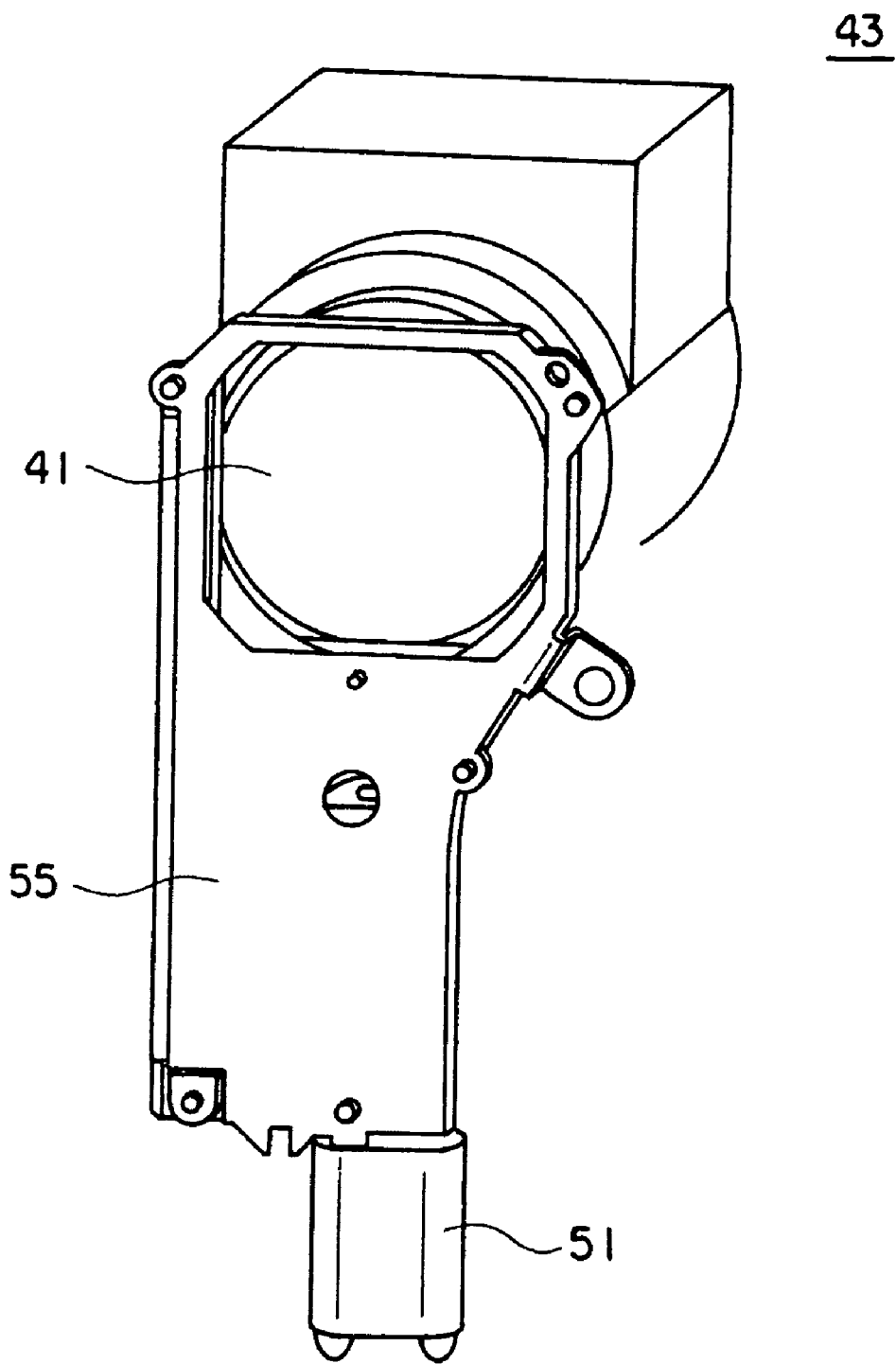
FIG. 10 is a perspective view of a lens barrier device in the video camera shown in FIGS. 1A and 1B.
Figure 11:
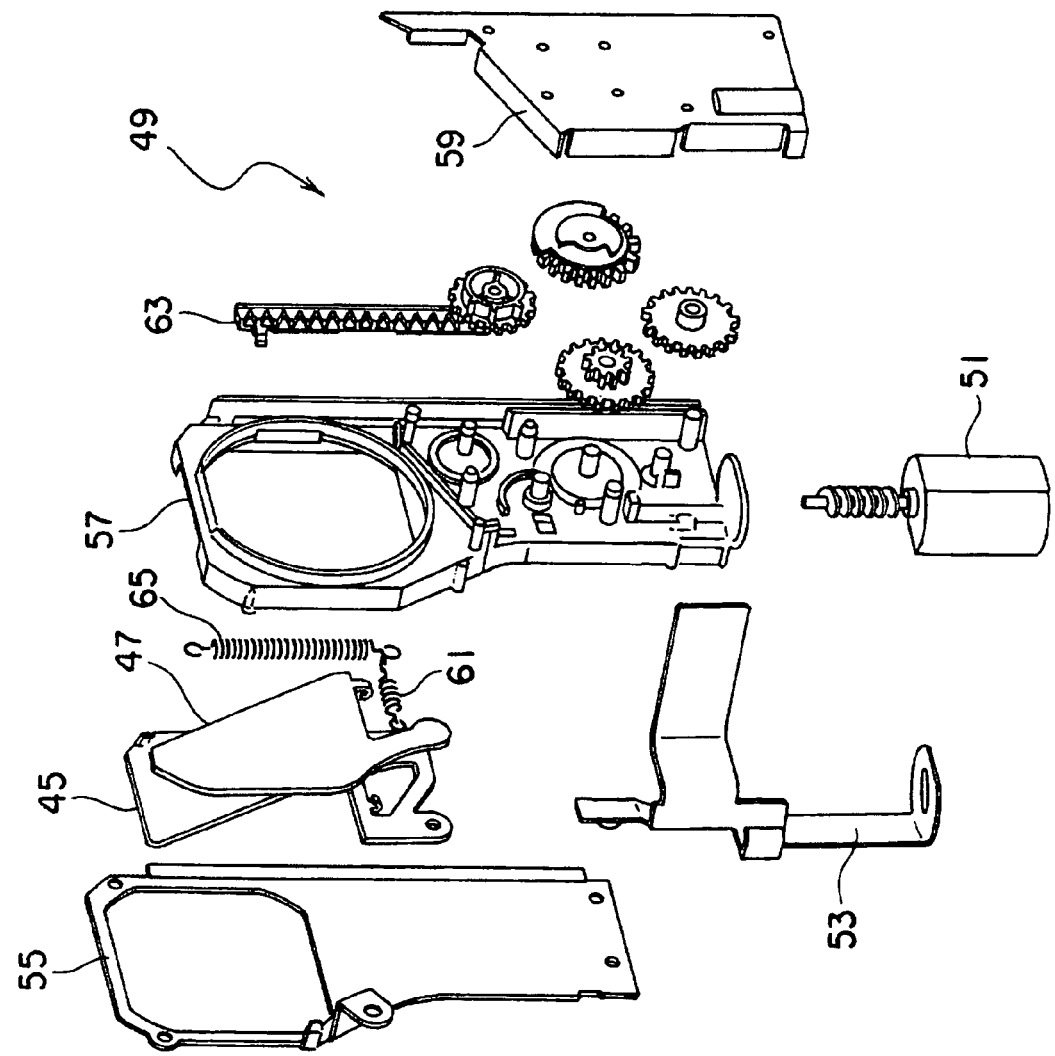
FIG. 11 is an exploded perspective view of the lens barrier device shown in FIG. 10.

FIG. 10 is a perspective view showing a lens barrier device 43 that opens and closes the opening 9*a* (FIG. 1A) in the lens portion 9 of the video camera 1 when viewed from the front of the video camera 1. FIG. 11 is an exploded perspective view showing the lens barrier device 43 when viewed from the rear (inside) of the video camera 1.

The lens barrier device 43 closes the opening 9*a* to protect the lens 41 when the video camera 1 is not used. The lens barrier device 43 includes, as shown in FIG. 11, a driving blade 45 and a driven blade 47 that open and close the opening 9*a*, a gear train 49 and a motor 51 that drive the driving blade 45 and the driven blade 47, an FPC assembly 53 that controls the motor 51 and other operations, and a front plate 55, a center base 57, and a rear plate 59 that hold the above components.

Figure 12:
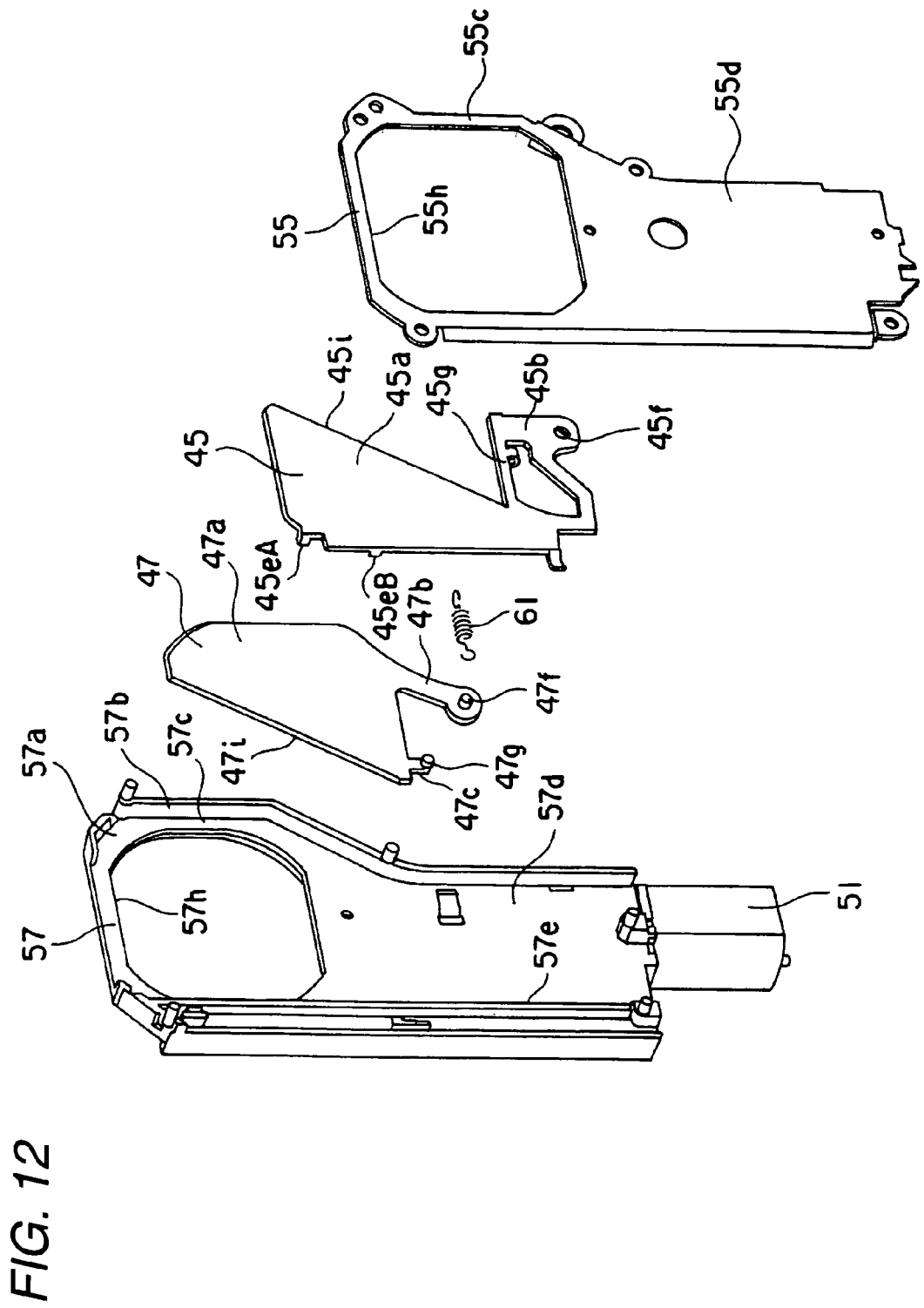
FIG. 12 is an exploded perspective view of a driving blade, a driven blade, and surrounding parts in the lens barrier device shown in FIG. 10.

FIG. 12 is an exploded perspective view of the driving blade 45, the driven blade 47, and surrounding parts in the lens barrier device 43 when viewed from the front of the video camera 1.

The front plate 55 and the center base 57 are disposed to face each other and fixed with the driving blade 45 and the driven blade 47 sandwiched therebetween. For example, the center base 57 includes a base 57*a* and a peripheral wall 57*b* that protrudes from the base 57*a* toward the front plate 55 to form a recess capable accommodating the driving blade 45 and the driven blade 47. The front plate 55 has a substantially plate-like shape and covers the center base 57. The center base 57 is made of, for example, a resin, and the front plate 55 is formed of, for example, a single sheet metal. The center base 57 is positioned by inserting bosses formed thereon into holes formed in the front plate 55, and fixed to the front plate 55, for example, by melting the bosses.

The front plate 55 and the center base 57 are disposed to face the inner surface of the front side of the body housing 13 in such a way that the front plate 55 and the center base 57 overlap with the lens portion 9 and the grip portion 11. The front plate 55 and the center base 57 are shaped similar to the front side of the body housing 13 when viewed from the front. That is, the front plate 55 and the center base 57 have substantially P-like shapes when viewed from the front, and have lens-side portions 55*c* and 57*c* having openings 55*h* and 57*h* formed therein to expose the lens 41 and accommodating portions 55*d* and 57*d* extending downward from the lens-side portions 55*c* and 57*c* and having widths in the right-left direction smaller than those of the lens-side portions 55*c* and 57*c*. The openings 55*h* and 57*h* have substantially the same size and shape as those of the opening 9*a*.

The driving blade 45 is configured to block the upper left portion of the opening 9*a* (FIG. 1A) that corresponds to approximately one-half the area thereof, when viewed from the front of the video camera 1. The driving blade 45 includes a blade body 45*a* that covers the lens 41 exposed through the opening 9*a* and a blade connecting portion 45*b* that extends downward from the blade body 45*a* and is connected to the driven blade 47. The blade body 45*a* has a substantially right-angled triangular shape when viewed from the front, and is disposed in such a way that the oblique line (edge 45*i*) approximately halves the opening 9*a* into upper left and lower right portions.

The driven blade 47 is configured to block the lower right portion of the opening 9*a* (FIG. 1A) that corresponds to approximately one-half the area thereof, when viewed from the front of the video camera 1. The driven blade 47 includes a blade body 47*a* that covers the lens 41 exposed through the opening 9*a* and extensions 47*b* and 47*c* that extends downward from the blade body 47*a* and connected to the driving blade 45. The blade body 47*a* has a substantially triangular shape (or a trapezoidal shape) when viewed from the front, and is disposed in such a way that the oblique line (edge 47*i*) approximately halves the opening 9*a* into upper left and lower right portions.

The driving blade 45 does not rotate but linearly slides in the up-down direction. Specifically, for example, a rail 57*e* is formed on the center base 57, the rail 57*e* protruding from the base 57*a* toward the front plate 55 and linearly extending in the up-down direction from the lens-side portion 57*c* to the accommodating portion 57*d*. A plurality of protrusions 45*e*A to 45*e*D (see also FIG. 17 and (b) in FIG. 18, where four protrusions are illustrated by way of example; in the following description, characters A to D are omitted in some cases) are formed on the driving blade 45 in a plurality of positions in the up-down direction (two of them are illustrated in the present embodiment), the protrusions protruding toward the center base 57 and sandwiching the rail 57*e* in the right-left direction. When the plurality of protrusions 45*e* are guided along the rail 57*e*, the driving blade 45 does not rotate but linearly slides in the up-down direction.

The driven blade 47 is pivotally supported by the driving blade 45, so that the slide motion of the driving blade 45 in the up-down direction can move the driven blade 47 in the up-down direction and change how much the driven blade 47 overlaps with the driving blade 45. Specifically, for example, a circular hole 45*f* is formed in the blade connecting portion 45*b* of the driving blade 45, and a cylindrical protrusion 47*f* for the hole 45*f* is formed on the extension 47*b* of the driven blade 47. The driven blade 47 is pivotally supported by the driving blade 45 by pivotally inserting the protrusion 47*f* into the hole 45*f* (see FIG. 13).

The lens barrier device 43 has a spring 61 as an urging member that urges the driving blade 45 and the driven blade 47 in the direction in which they are separated from each other (in the direction in which the degree of the overlap becomes small). The spring 61 is formed of, for example, a helical spring. Protruding spring catchers 45*g* and 47*g* that catch the spring 61 are formed on the blade connecting portion 45*b* of the driving blade 45 and the extension 47*c* of the driven blade 47, respectively.

Figure 13:
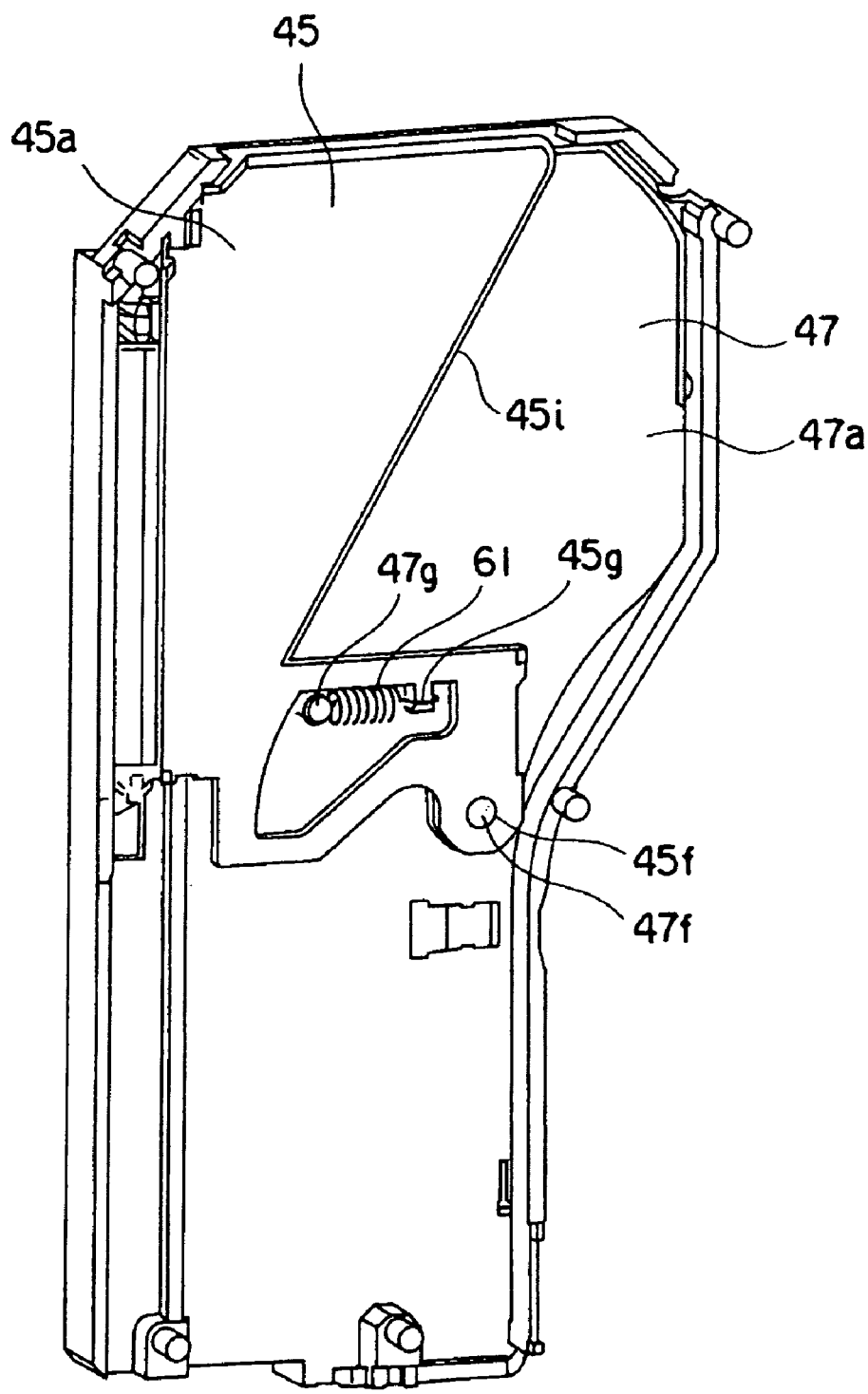
FIG. 13 is a perspective view showing the assembly of the driving blade and the driven blade shown in FIG. 12.

FIG. 13 is a perspective view of the driving blade 45, the driven blade 47, and the spring 61 assembled and attached to the center base 57 (without the front plate 55) when viewed from the front.

When viewed from the front, the blade body 45*a* of the driving blade 45 is positioned on the left side and the blade body 47*a* of the driven blade 47 is positioned on the right side. Conversely, the spring catcher 45*g* of the driving blade 45 is positioned on the right side and the spring catcher 47*g* of the driven blade 47 is positioned on the left side. Further, the spring catchers 45*g* and 47*g* are positioned on the blade body 45*a* (blade body 47*a*) side with respect to the pivotal point (protrusion 47*f*). Therefore, when the spring 61 is attached to the spring catchers 45*g* and 47*g* and tensioned, the tensile force of the spring 61 urges the driving blade 45 and the driven blade 47 in the direction in which the blade bodies 45*a* and 47*a* are separated from each other (in the direction in which the degree of the overlap becomes small).

Figure 14:
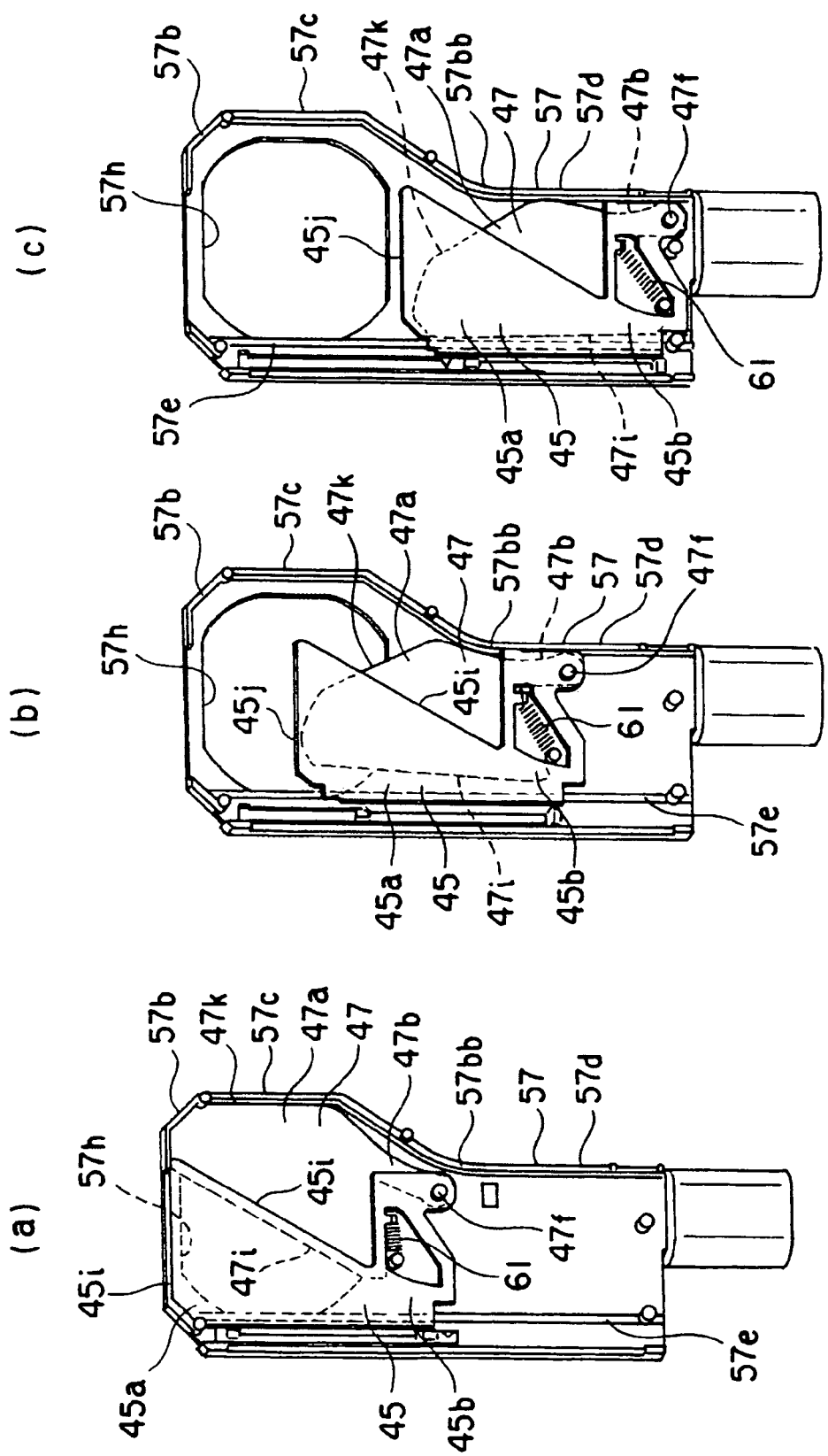
FIG. 14 illustrates views explaining the operation of the driving blade and the driven blade shown in FIG. 12.

FIG. 14 illustrates views explaining the operation of the driving blade 45 and the driven blade 47. (a) in FIG. 14 shows a state in which the opening 9*a* (FIG. 1A) is blocked and the lens 41 is covered. (b) in FIG. 14 shows a state in which the opening 9a is being opened (or closed). (c) in FIG. 14 shows a state in which the opening 9a is open and the lens 41 is exposed.

As shown in (a) in FIG. 14, in the closed state, the blade body 45a of the driving blade 45 and the blade body 47a of the driven blade 47 are accommodated in the lens-side portion 57c of the center base 57. The blade bodies 45a and 47a are unfolded, and the width of the blade bodies 45a and 47a as a whole is larger than those of the opening 57h (opening 9a) and the accommodating portion 57d. The edges 45i and 47i of the blade bodies 45a and 47a are steeper than 45 degrees (greater than 45 degrees and closer to the vertical line), and the width of each of the blade bodies 45a and 47a in the right-left direction is smaller than the diameter of the opening 57h in the right-left direction.

In the closed state, the upper ends of the driving blade 45 and the driven blade 47 abut the upper portion of the peripheral wall 57b of the center base 57, so that the driving blade 45 and the driven blade 47 are restricted from moving upward. The rightward or leftward motion and rotation of the driving blade 45 is restricted because the plurality of protrusions 45e (FIG. 12) on the driving blade 45 engage the rail 57e of the center base 57. The rightward or leftward motion of the driven blade 47 is restricted because the spring 61 urges the driven blade 47 rightward in the plane of view and the right edge of the blade body 47a of the driven blade 47 abuts a side wall 57bb of the peripheral wall 57b.

The side wall 57bb is the portion of the peripheral wall 57b that extends in the up-down direction along the right edge (in the plane of view) of the center base 57. When viewed from the front of the video camera 1, the side wall 57bb follows a gentle Z-like shape in accordance with the fact that the body housing 13 has a P-like shape, so that the lower portion (accommodating portion 57d side) of the side wall 57bb is located closer to the left (driving blade 45 side) than the upper portion (lens-side portion 57c side).

As shown in (b) in FIG. 14, the driving blade 45 does not rotate but linearly slides in the downward direction. Since the driven blade 47 is pivotally supported by the driving blade 45, the driven blade 47 moves downward as the driving blade 45 moves downward. In this process, the blade body 47a of the driven blade 47 abuts the side wall 57bb of the center base 57 and receives a reaction force toward the driving blade 45. Since the blade body 47a is positioned above the pivotal point (protrusion 47f), the driven blade 47 rotates counterclockwise and gradually overlaps with the driving blade 45. In this process, the spring 61 is, for example, gradually stretched. The open state shown in (c) in FIG. 14 is thus attained.

As shown in (c) in FIG. 14, when the driven blade 47 overlaps with the driving blade 45, the driving blade 45 and the driven blade 47 are folded into a smaller size than the size thereof in the open state. In this way, the width of the blade body 45a of the driving blade 45 and the blade body 47a of the driven blade 47 as a whole in the right-left direction becomes smaller than the width thereof in the open state, so that the blade bodies 45a and 47a are accommodated in the accommodating portion 57d having a smaller width in the right-left direction than the width of the lens-side portion 57c in the right-left direction.

Since the driving blade 45 does not rotate but slides, the orientation of the driving blade 45 in the open state remains unchanged, and the width in the right-left direction in the open state remains unchanged in the closed state. That is, the width of the blade body 45a of the driving blade 45 in the right-left direction is still the same as the length of the upper edge of the blade body 45a that extends in the right-left direction. The width of the blade body 45a of the driving blade 45 in the right-left direction is smaller than the diameter of the opening 57h in the right-left direction but larger than the width of the accommodating portion 57d (grip portion 11). However, the upper edge 45j extending in the right-left direction is located adjacent to the lower linear edge of the opening 57h, and the edge 45i that forms the oblique line of the right-angled triangle follows the inclined portion of the side wall 57bb of the center base 57 that extends from the lens-side portion 57c to the accommodating portion 57d, that is, the shape of the blade body 45a coincides with the shape of the area between the lens-side portion 57c and the accommodating portion 57d. The driving blade 45 therefore completely retracts from the opening 57h.

Since the driven blade 47 rotates and translates, the width of the blade body 47a in the right-left direction in the open state differs from the width thereof in the closed state. In the closed state, the width of the blade body 47a in the right-left direction is defined by the distance between an edge 47k extending in the up-down direction on the right side in the plane of view and the lower end of the edge 47i extending diagonally across the opening 57h. In the open state, the edge 47i is substantially parallel to the rail 57e (the sliding direction), so that the width of the blade body 47a in the open state is defined by the distance between the edge 47i and the lower end of the edge 47k. From the fact that the width of the blade body 47a in the closed state corresponds to the length of a side other than the oblique line of the triangle and the width in the open state corresponds to the length of the normal to the oblique line from the apex of the triangle that corresponds to the right angle, and that the blade body 47a has a trapezoidal shape with the apex of the triangle that originally corresponds to the right angle is chamfered, the width of the blade body 47a in the open state is smaller than the width in the closed state. Therefore, the rotation of the driven blade 47 moves the blade body 47a of the driven blade 47 toward the blade body 45a of the driving blade 45 and causes the blade body 47a to overlap with the blade body 45a, whereby not only does the width of the blade bodies 45a and 47a as a whole become smaller, but also the width of the blade body 47a itself of the driven blade 47 becomes smaller.

The pivotal point (protrusion 47f), which is provided in the extension 47b, is provided in a position spaced apart from the blade body 47a of the driven blade 47. As a result, a large radius of rotation of the blade body 47a efficiently moves the blade body 47a toward the driving blade 45.

As shown in FIG. 11, the driving blade 45 is driven by the gear train 49 arranged on the opposite side of the center base 57 to the driving blade 45. The gear train 49 has a rack gear 63 that moves in the longitudinal direction. Connecting the rack gear 63 to the driving blade 45 allows a drive force necessary to slide the driving blade 45 to be transmitted thereto. Specifically, the rack gear 63 is connected to the driving blade 45 in the following manner:

FIG. 15 shows the rack gear 63. (a) in FIG. 15 is a perspective view of the rack gear 63 viewed from the front (driving blade 45 side). (b) in FIG. 15 is a perspective view of the rack gear 63 viewed from the rear (gear train 49 side). (c) in FIG. 15 is a plan view of the rack gear 63.

The rack gear 63 includes a gear body 63a on which a plurality of teeth 63z are linearly arranged, and a protrusion 63b protruding forward and located in a position close to the upper end of the gear body 63a. The protrusion 63b branches off into a first locking portion 63c that locks the rack gear 63 to the center base 57 and a second locking portion 63d that connects the rack gear 63 to the driving blade 45.

Figure 16:
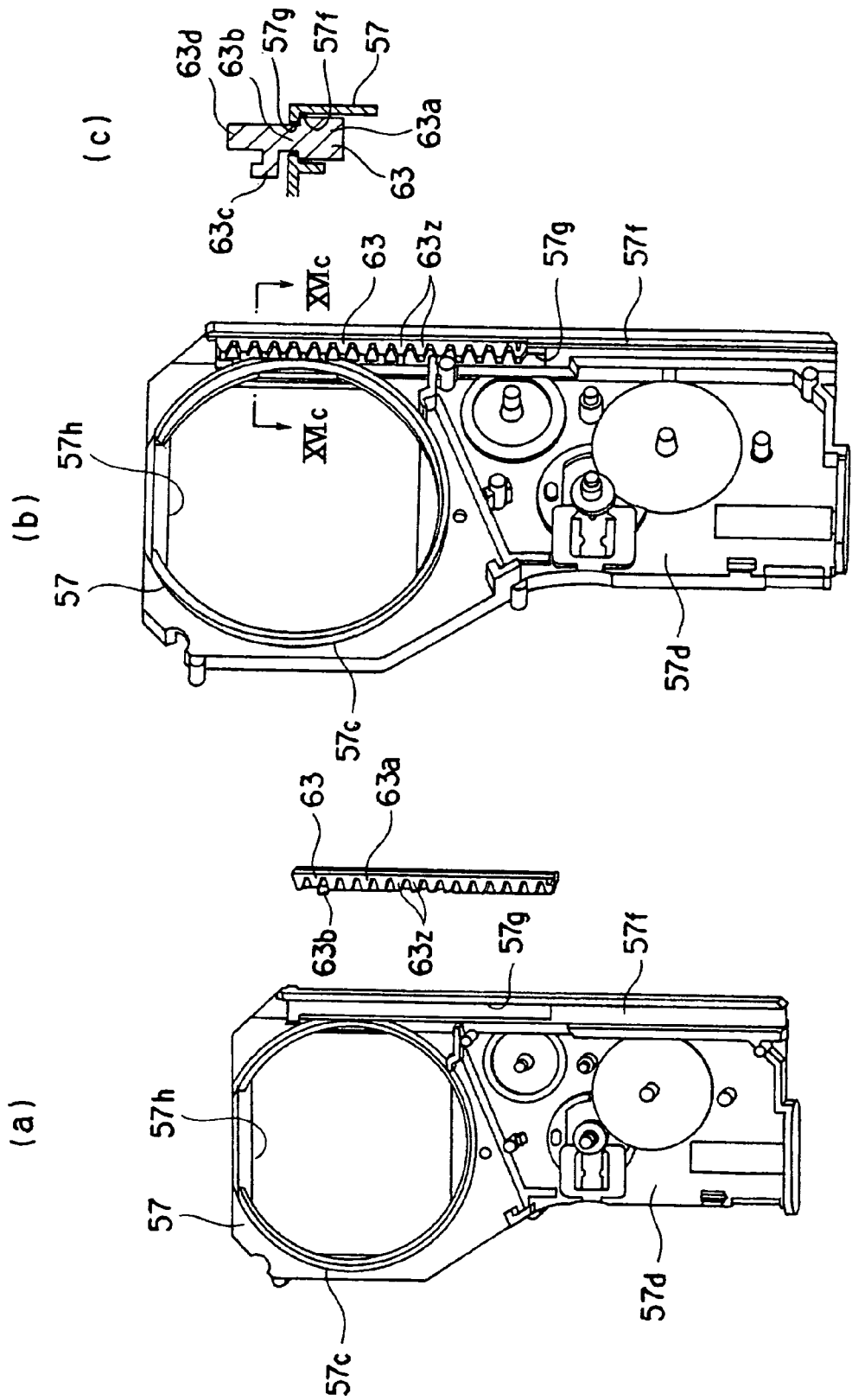
FIG. 16 illustrates views explaining how to attach the rack gear shown in FIG. 15 to a center base.

FIG. 16 illustrates views explaining how to attach the rack gear 63 to the center base 57. (a) in FIG. 16 is an exploded perspective view of the center base 57 and the rack gear 63 when viewed from the rear (gear train 49 side). (b) in FIG. 16 is a perspective view showing the rack gear 63 attached to the center base 57 when viewed from the rear. (c) in FIG. 16 is a cross-sectional view taken along the line XVIc-XVIc shown in (b) in FIG. 16.

A guide groove 57f is formed in the center base 57, the guide groove 57f capable of accommodating the gear body 63a of the rack gear 63 and guiding it in the up-down direction. The guide groove 57f is configured, for example, by forming ribs protruding toward the gear train 49 (the viewer's side in the plane of view of FIG. 16, and the lower side in the plane of view of (c) in FIG. 16). The guide groove 57f is provided on the right side (in the plane of view) of the opening 57h (on the side opposite the portion of the lens-side portion 57c that protrudes beyond the accommodating portion 57d) and linearly extends throughout the lens-side portion 57c and accommodating portion 57d of the center base 57, as shown in FIG. 16. The length of the guide groove 57f is, for example, approximately twice the length of the rack gear 63.

A slit 57g is formed in the bottom of the guide groove 57f, and the protrusion 63b of the rack gear 63 is inserted into the slit 57g and guided therealong. As shown in FIG. 16, the slit 57g has a length approximately one-half the guide groove 57f, is disposed on the opening 57h side, and extends to a point below the opening 57h. As shown in (c) in FIG. 16, the width of a large portion of the slit 57g is smaller than the width (the width viewed from the front) of the gear body 63a of the rack gear 63 but set to a fixed size larger than the width of the portion of the protrusion 63b that is apart from the first locking portion 63c and closer to the base of the protrusion 63b. An enlarged diameter portion is formed in part of the upper end of the slit 57g, the width of the enlarge diameter portion being larger than the widths of the gear body 63a and the protrusion 63b (first locking portion 63c).

The rack gear 63 is inserted into the guide groove 57f by inserting the protrusion 63b into the enlarged diameter portion at the upper end portion of the slit 57g in such a way that the plurality of teeth 63z face the opening 57h (the left side in the plane of view of FIG. 16). As shown in (c) in FIG. 16, the first locking portion 63c of the rack gear 63 protrudes from a point somewhere middle of the protrusion 63b in the direction that crosses the direction in which the slit 57g is open. When the rack gear 63 is inserted into the guide groove 57f and caused to slide downward, the bottom of the guide groove 57f is sandwiched between the first locking portion 63c and the gear body 63a, whereby the rack gear 63 is attached to the center base 57 in such a way that the rack gear 63 can slide along the guide groove 57f. The second locking portion 63d protrudes forward (driving blade 45 side) from the center base 57.

Figure 17:
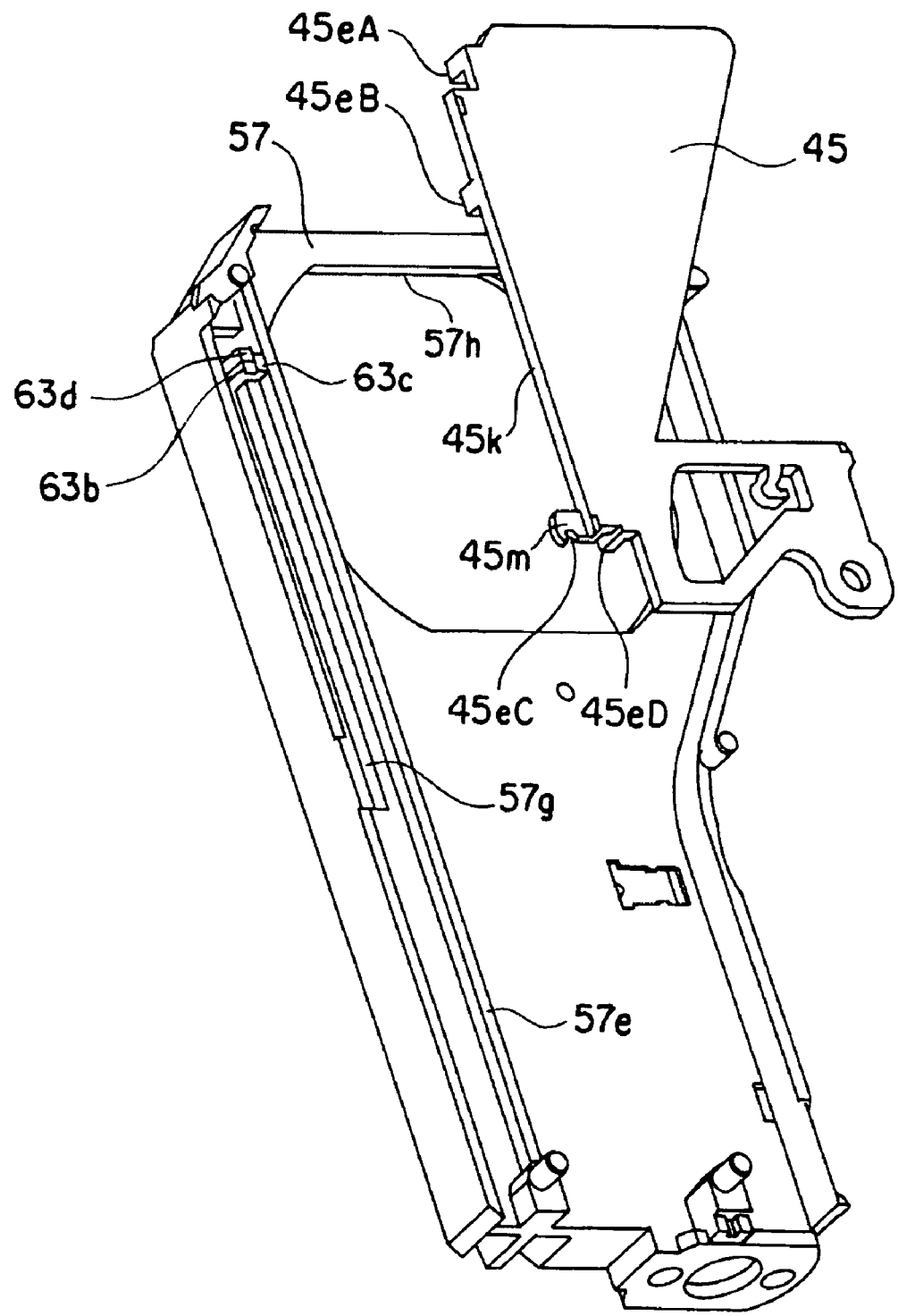
FIG. 17 is a view explaining how to attach the driving blade to the center base shown in FIG. 12.

FIG. 17 is an exploded perspective view of the center base 57, the driving blade 45, and other components viewed from the front. The slit 57g described above is open, for example, in an area on the left side of the rail 57e, which guides the driving blade 45, in the plane of view of FIG. 17 (the side opposite the portion of the lens-side portion 57c of the center base 57 that protrudes beyond the accommodating portion 57d). The protrusion 63b (second locking portion 63d) of the rack gear 63 protrudes from the slit 57g, as described above. The first locking portion 63c is located adjacent to or abuts a side of the rail 57e.

Figure 18:
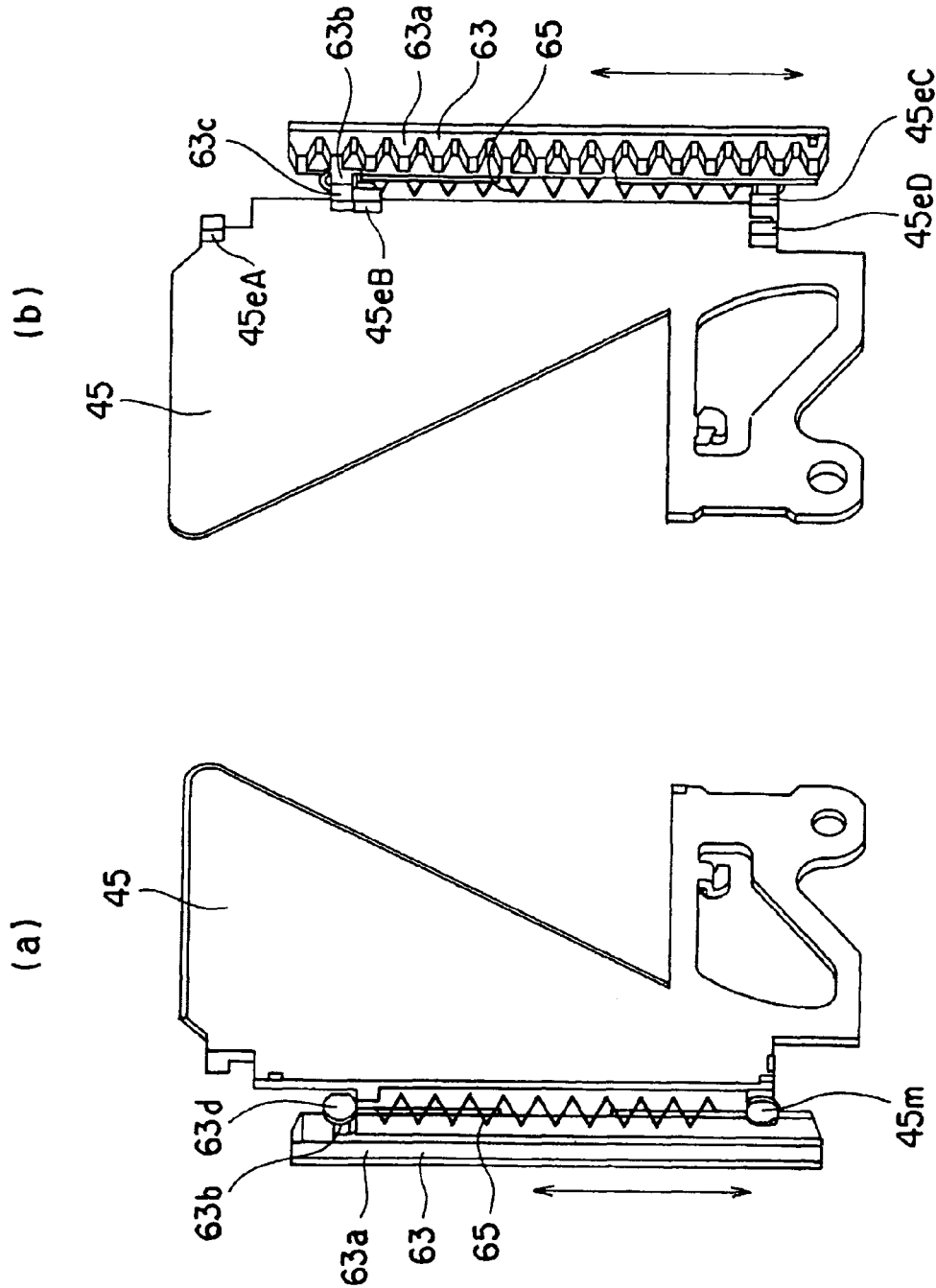
FIG. 18 illustrates views explaining the connection between the driving blade shown in FIG. 12 and the rack gear shown in FIG. 15.

The driving blade 45 has a locking portion 45m that protrudes from an edge 45k on the left side in the plane of view of FIG. 17 toward the left side in the plane of view of FIG. 17. The locking portion 45m is formed, for example, in a lower portion of the driving blade 45. The driving blade 45 is attached to the center base 57 in such a way that the protrusions 45e fit in the rail 57e. The driving blade 45 is connected to the protrusion 63b of the rack gear 63 in the following manner:

FIG. 18 illustrates perspective views showing a state in which the rack gear 63 is connected to the driving blade 45, but the center base 57 is omitted in FIG. 18. (a) in FIG. 18 shows the assembly viewed from the front, and (b) in FIG. 18 shows the assembly viewed from the rear.

As shown in (a) in FIG. 18, a spring 65 as an elastic member is hung from the second locking portion 63d of the rack gear 63 and attached to the locking portion 45m of the driving blade 45. The spring 65 is formed of, for example, a helical spring. Since the locking portion 45m is located below the second locking portion 63d, the tensile force of the spring 65 elastically restricts the relative motion between the driving blade 45 and the rack gear 63 in which the driving blade 45 moves downward whereas the rack gear 63 moves upward.

As shown in (b) in FIG. 18, the protrusion 45eB of the plurality of protrusions 45e of the driving blade 45, which are guided along the rail 57e, moves from below to above toward the first locking portion 63c, which engages the center base 57, and abuts and engages the first locking portion 63c. In this way, the tensile force of the spring 65 restricts the relative motion between the driving blade 45 and the rack gear 63 in which the driving blade 45 moves upward whereas the rack gear 63 moves downward.

Figure 19:
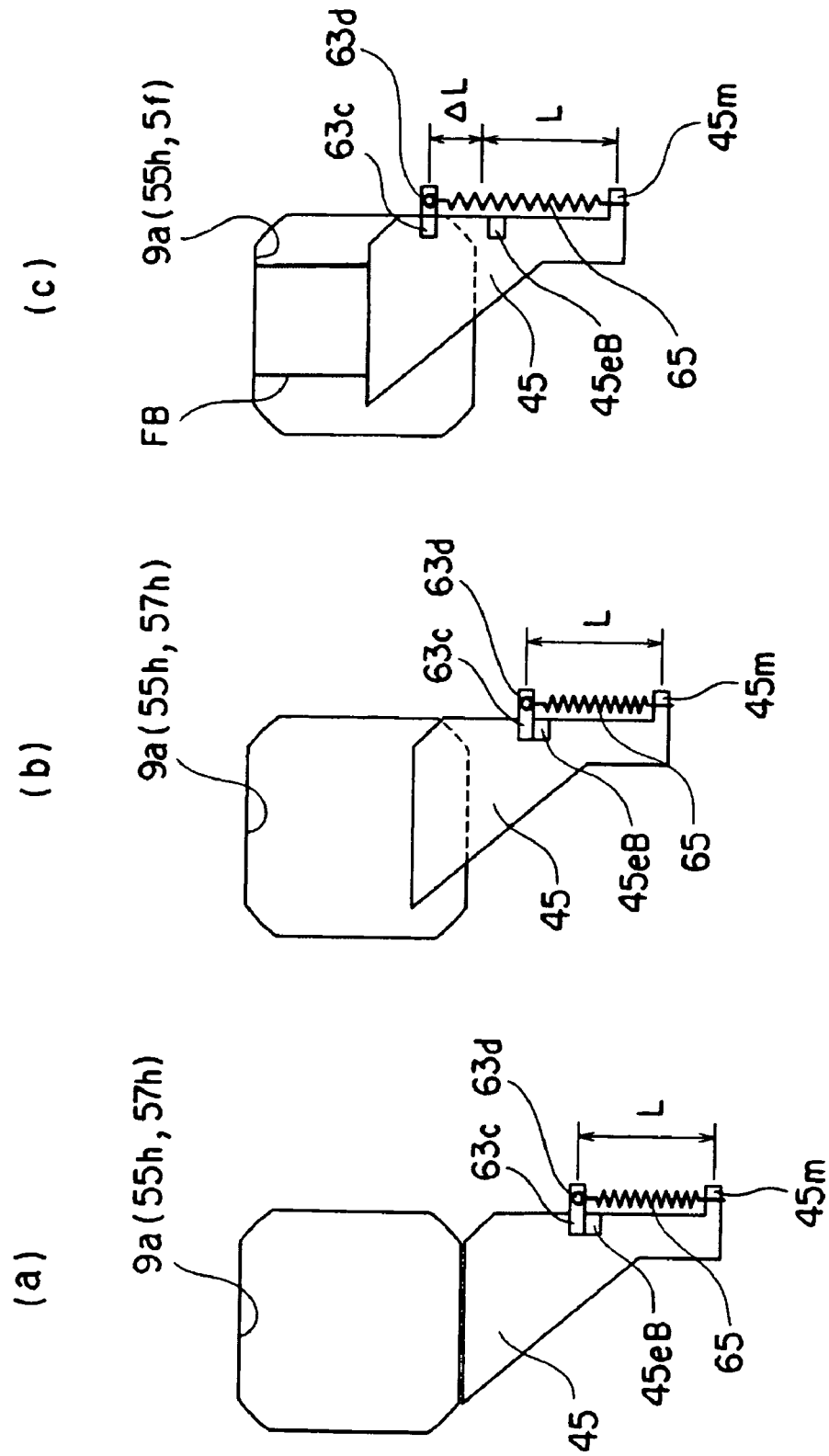
FIG. 19 illustrates views explaining the operation of the driving blade shown in FIG. 12 and the rack gear shown in FIG. 15.

FIG. 19 illustrates diagrammatic views explaining the operation of the driving blade 45 and the rack gear 63. In the rack gear 63 shown in FIG. 19, the gear body 63a is omitted and only the first and second locking portions 63c, 63d are shown.

In the open state shown in (a) in FIG. 19, the protrusion 45eB of the driving blade 45 engages the second locking portion 63d of the rack gear 63, so that the upward motion of the driving blade 45 is restricted. On the other hand, the tensile force of the spring 65 urges the driving blade 45 upward, so that the downward motion of the driving blade 45 is restricted. The tensile force of the spring 65 at this point may be set as appropriate, or the tensile force (extension) at this point may be zero.

As shown in (b) in FIG. 19, to achieve the closed state, when the rack gear 63 is moved upward, the driving blade 45 is pulled up by the spring 65 and moves upward. The length L of the spring 65 in the state shown in (b) in FIG. 19 is the same as that shown in (a) in FIG. 19 provided that the spring 65 is attached to produce a tensile force greater than or equal to a certain value in the state shown in (a) in FIG. 19, whereas the length L of the spring 65 in the state shown in (b) in FIG. 19 is longer than the length in the state shown in (a) in FIG. 19 by an extension that corresponds to the force necessary to drive the driving blade 45 and other components provided that the tensile force of the spring 65 is smaller than the certain value or zero in the state shown in (a) in FIG. 19.

As shown in (c) in FIG. 19, when a foreign body FB is sandwiched between the edge of the opening 9a and the driving blade 45 in the course toward the closed state, the driving blade 45 stops moving. However, the rack gear 63 moves upward and extends the spring 65. The spring 65 gradually increases the force that tries to stop the motion of the rack gear 63 as the extension ΔL increases. It is thus possible to reduce impact applied to the driving blade 45, the rack gear 63, the motor 51, and other components.

The spring constant of the spring 65, the drive force of the motor 51, and other parameters may be set in such a way that the rack gear 63 moves all the way up to the upper end even when a large foreign body FB prevents the driving blade 45 from moving upward from the very beginning at the open position, or may be set in such a way that, when the driving blade 45 stops moving, the rack gear 63 moves upward by a predetermined length and then stops.

To make transition from the closed state to the open state, the rack gear 63 is moved downward to move the first locking portion 63c of the rack gear 63 from above to below and engage the protrusion 45eb of the driving blade 45. The driving blade 45 thus moves downward.

Figure 20:
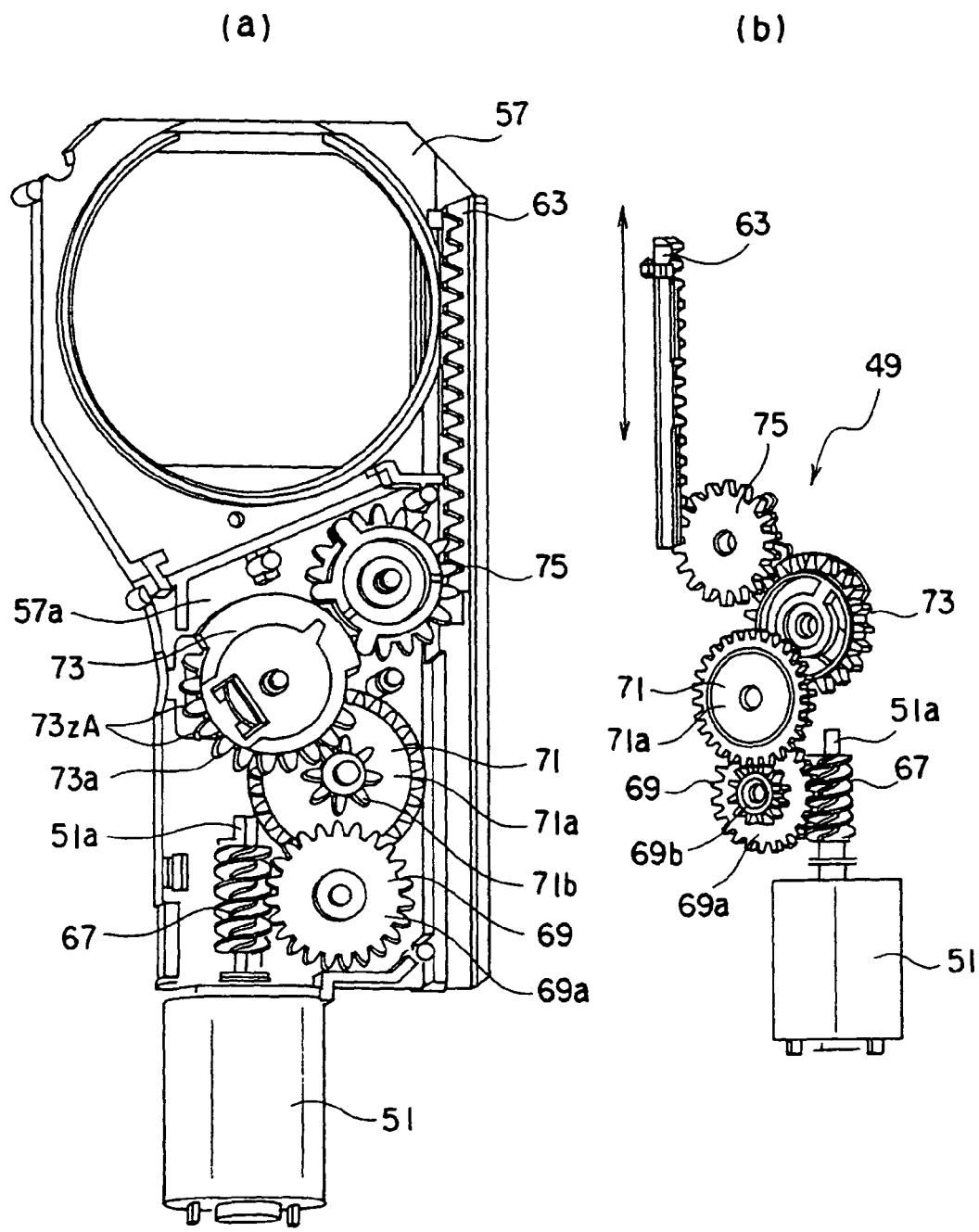
FIG. 20 illustrates views explaining a gear train that drives the driving blade shown in FIG. 12.

FIG. 20 illustrates views explaining the configuration of the gear train 49. (a) in FIG. 20 is a perspective view showing the gear train 49 attached to the center base 57 when viewed from the rear of the video camera 1, and (b) in FIG. 20 is a perspective view showing the gear train 49 without the center base 57 when viewed from the front of the video camera 1.

The gear train 49 includes a worm gear 67 that is fixed to an output shaft 51a of the motor 51, a wheel gear 69 that engages the worm gear 67, a reduction gear 71 that engages the wheel gear 69, a cam gear 73 that engages the reduction gear 71, and a rack drive gear 75 that engages the cam gear 73.

The worm gear 67 rotates along with the output shaft 51a of the motor 51 around the output shaft 51a. The motor 51 is fixed, for example, to the lower end of the center base 57 with the output shaft 51a oriented upward, and the output shaft 51a and the worm gear 67 are disposed in a position where they overlap with the center base 57 and rotatable around an axis of rotation extending in the up-down direction.

Each of the wheel gear 69, the reduction gear 71, the cam gear 73, and the rack drive gear 75 has a shaft inserted therein, the shaft protruding from the base 57a of the center base 57 toward the rear side thereof and rotatable around an axis of rotation extending in the front-rear direction of the video camera 1. The rear plate 59 (FIG. 11) fixed to the rear side of the center base 57 prevents the gears from dropping off the shafts supported by the center base 57.

The wheel gear 69 includes a large-diameter portion 69a that engages the worm gear 67 and a small-diameter portion 69b ((b) in FIG. 20) having a fewer number of teeth than the large-diameter portion 69a. Since the worm gear 67 engages the large-diameter portion 69a, the rotation of the output shaft 51a of the motor 51 around the axis of rotation extending in the up-down direction is converted into the rotation of the wheel gear 69 around the axis of rotation extending in the front-rear direction.

The reduction gear 71 includes a large-diameter portion 71a that engages the small-diameter portion 69b of the wheel gear 69 and has a greater number of teeth than the small-diameter portion 69b, and a small-diameter portion 71b ((a) in FIG. 20) having a fewer number of teeth than the large-diameter portion 71a. Since the number of teeth of the small-diameter portion 69b of the wheel gear 69 is fewer than that of the large-diameter portion 69a of the wheel gear 69, and the number of teeth of the large-diameter portion 71a of the reduction gear 71 is greater than that of the small-diameter portion 69b of the wheel gear 69, the reduction gear 71 rotates at a speed slower than the wheel gear 69.

Figure 21:
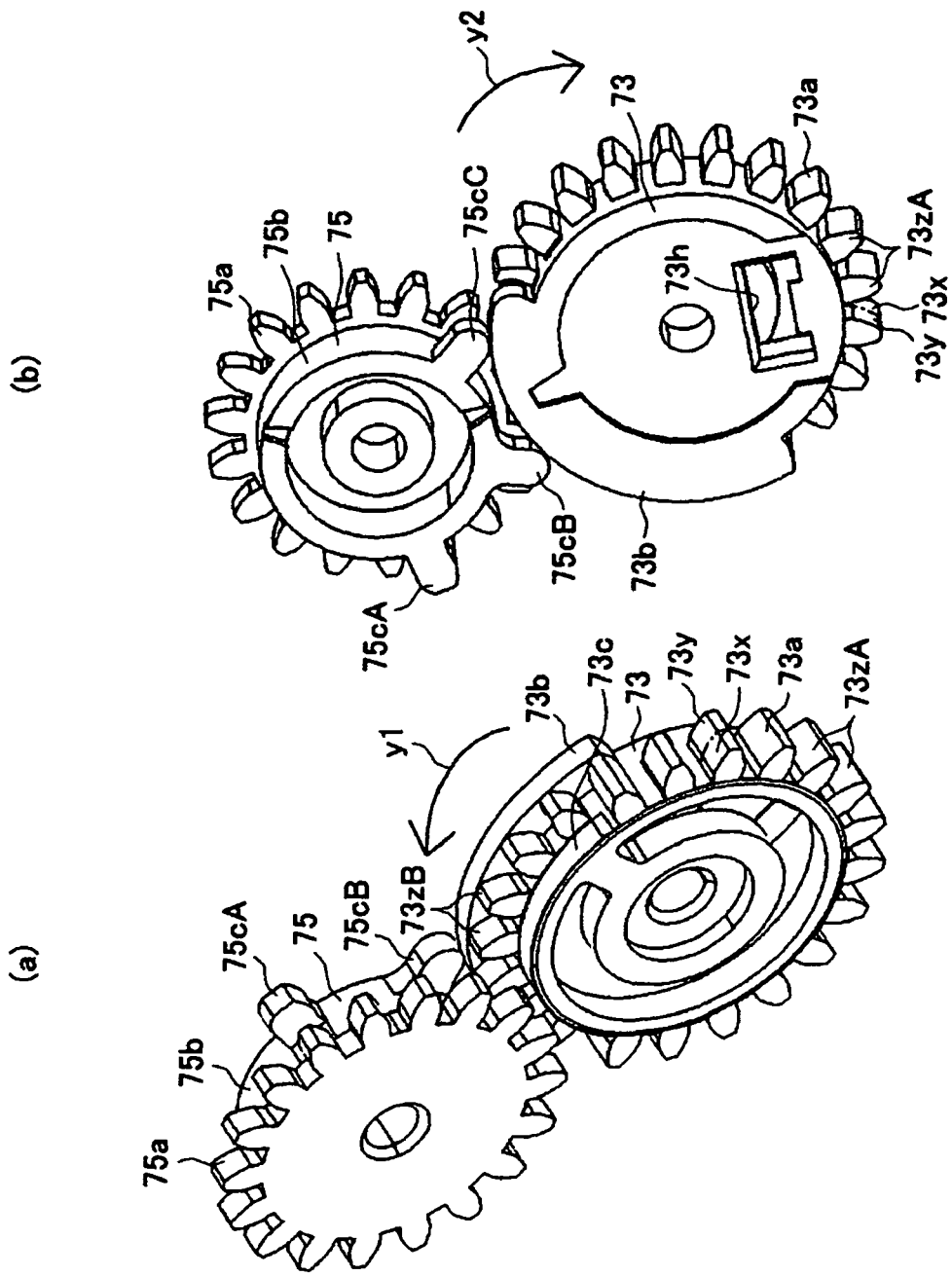
FIG. 21 illustrates perspective views showing a cam gear and a rack drive gear in the gear train shown in FIG. 20.
Figure 22:
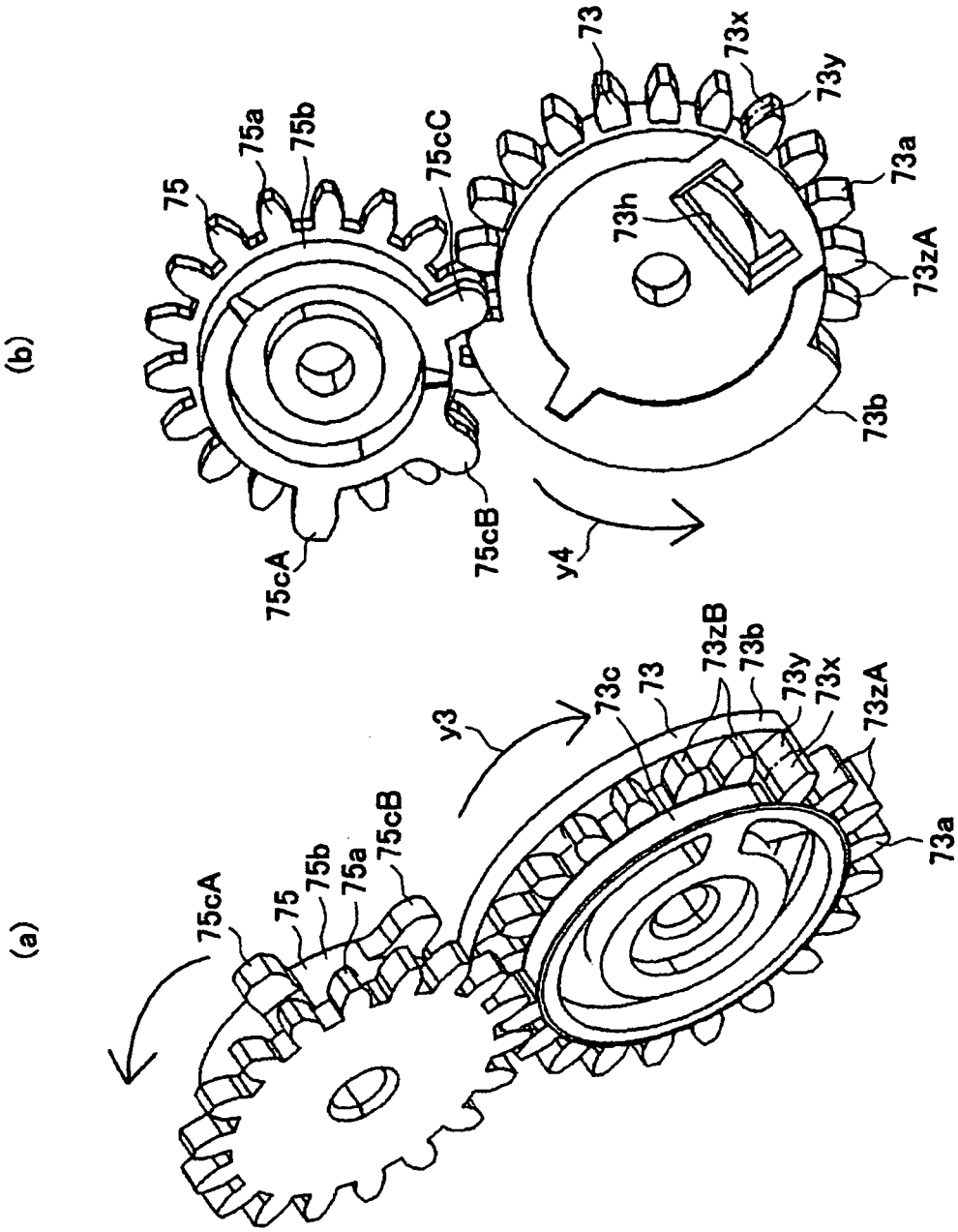
FIG. 22 illustrates perspective views showing the cam gear and the rack drive gear in the gear train shown in FIG. 20 in a state different from the state in FIG. 21.
Figure 23:
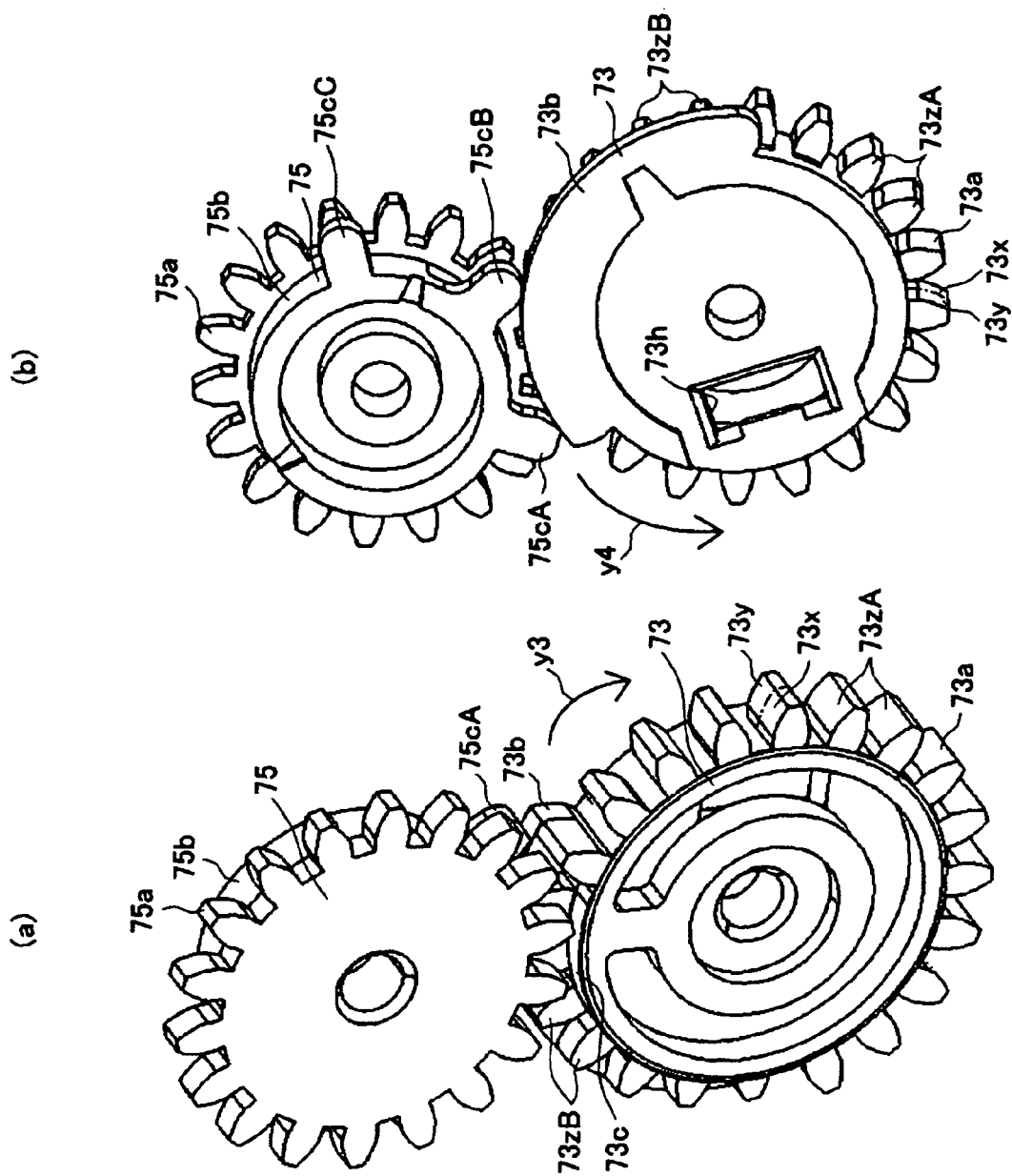
FIG. 23 illustrates perspective views showing the cam gear and the rack drive gear in the gear train shown in FIG. 20 in a state different from the states in FIGS. 21 and 22.
Figure 24:
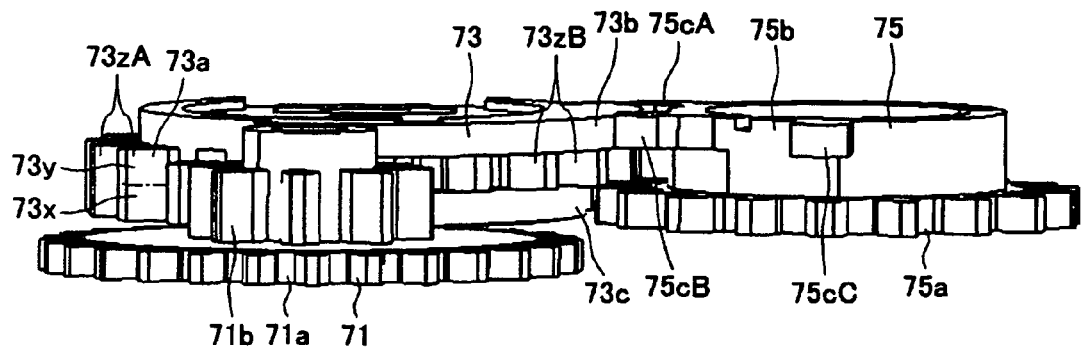
FIG. 24 is a perspective view showing a reduction gear, the cam gear, and the rack drive gear in the gear train shown in FIG. 20.

FIGS. 21 to 23 are enlarged views of the cam gear 73 and the rack drive gear 75. FIGS. 21 to 23 show different states of the cam gear 73 and the rack drive gear 75. (a) in FIGS. 21, 22, and 23 are perspective views when viewed from the front of the video camera 1, and (b) in FIGS. 21, 22, and 23 are perspective views when viewed from the rear of the video camera 1. FIG. 24 is an enlarged perspective view showing the reduction gear 71, the cam gear 73, and the rack drive gear 75 viewed from the right side in the plane of view of (a) in FIG. 20.

The cam gear 73 and the rack drive gear 75 can not only simply transmit power to the rack gear 63 but also accurately stop the rack gear 63. A specific description follows:

The cam gear 73 includes a gear portion 73a on which a plurality of wide teeth 73zA and narrow teeth 73zB are arranged along the circumferential direction, and a cam portion 73b provided coaxially with the gear portion 73a.

The narrow teeth 73zB are formed as if by cutting the width (length in the direction of the axis of rotation) of a plurality of wide teeth 73zA within a certain range among the plurality of wide teeth 73zA arranged along the circumference of the cam gear 73. Parameters other than the tooth width (tooth thickness, pitch, tooth depth, and the like) of the narrow teeth 73zB are the same as those of the wide teeth 73zA. The portion formed as if by cutting the width (length in the direction of the axis of rotation) of the plurality of wide teeth 73zA forms a no-tooth portion 73c.

The configuration of the gear portion 73a can also be understood as follows: The gear portion 73a includes a plurality of first teeth 73y (portions of the wide teeth 73zA located on the narrow teeth 73zB side and having a width approximately one-half the width of the wide teeth 73zA) provided along the circumference and a plurality of second teeth 73x (the remainder of the wide teeth 73zA) arranged coaxially with the plurality of first teeth 73y. A plurality of second teeth 73x within a certain range are omitted to form the non-tooth portion 73c, and pairs of the first tooth 73y and the second tooth 73x are integrally formed. When the gear portion 73a is described in the following sections, the terms "wide tooth 73zA," "narrow tooth 73zB," "first tooth 73y," and "second tooth 73x" are used as appropriate for ease of description.

The gear portion 73a of the cam gear 73 can engage the small-diameter portion 71b of the reduction gear 71, as shown in FIGS. 20 and 24. Since the reduction gear 71 engages both the first teeth 73y and the second teeth 73x of the gear portion 73a, the reduction gear 71 transmits its rotation to the gear portion 73a irrespective of the presence of the no-tooth portion 73c. The number of teeth of the gear portion 73a (the number of the first teeth 73y) is, for example, greater than the number of teeth of the small-diameter portion 71b of the reduction gear 71. Since the number of teeth of the small-diameter portion 71b of the reduction gear 71 is fewer than the number of teeth of the large-diameter portion 71a of the reduction gear 71, and the number of teeth of the gear portion 73a of the cam gear 73 is greater than the number of teeth of the small-diameter portion 71b of the reduction gear 71, the cam gear 73 rotates at a speed slower than the reduction gear 71.

The rack drive gear 75 includes a gear portion 75a on which a plurality of teeth is arranged along the circumference and a sliding portion 75b that is provided coaxially with the gear portion 75a and can abut the cam portion 73b of the cam gear 73.

The gear portion 75a can engage the second teeth 73x of the cam gear 73. The gear portion 75a, however, does not engage the first teeth 73y of the cam gear 73. Therefore, when the cam gear 73 is positioned within a predetermined range in the direction of rotation, the gear portion 75a of the rack drive gear 75 engages the second teeth 73x of the cam gear 73, so that the rotation of the cam gear 73 is transmitted to the rack drive gear 75, which rotates accordingly, whereas when the cam gear 73 is positioned in the other range, the gear portion 75a is positioned in the no-tooth portion 73c of the cam gear 73, so that the rotation of the cam gear 73 is not transmitted to the rack drive gear 75. The number of teeth of the gear portion 75a is, for example, fewer than or equal to the number of teeth of the cam gear 73 (the number of first teeth 73y), so that the rack drive gear 75 rotate at a speed faster than or equal to that of the cam gear 73.

The gear portion 75a of the rack drive gear 75 engages the gear body 63a of the rack gear 63. Therefore, when the rack drive gear 75 rotates, the rack gear 63 translates in the up-down direction. The number of teeth of the gear portion 75a of the rack drive gear 75 is, for example, slightly fewer than the number of teeth of the rack gear 63 (for example, the number of teeth of the gear portion 75a is 18, whereas the number of teeth of the rack gear 63 is 16), so that the rack gear 63 moves from one end of its movable range to the other end thereof when the rack drive gear 75 rotates a little less than 360 degrees.

The cam portion 73b of the cam gear 73 is formed of a protruding linear portion that protrudes in the radial direction and extends in the circumferential direction of the cam gear 73. The cam portion 73b is provided over the range where the no-tooth portion 73c is provided (the range where narrow teeth 73zB are disposed). More specifically, the cam portion 73b is provided over the range from the wide tooth 73zA adjacent to one end of the no-tooth portion 73c to the wide tooth 73zA adjacent to the other end of the no-tooth portion 73c. The cam portion 73b as a whole, for example, protrudes from the bottom of the narrow teeth 73zB by the amount comparable to the depth of the teeth.

The sliding portion 75b of the rack drive gear 75 has a plurality of tabs 75cA, 75cB, and 75cC (characters A to C may be hereinafter omitted in some cases) protruding in the radial direction and arranged along the circumferential direction of the rack drive gear 75. The plurality of tabs 75c, for example, have the same shape and size and are disposed at uniform intervals. The tabs 75c protrude by an amount that allows the tabs 75c to abut the outer circumferential surface of the cam portion 73b of the cam gear 73 but does not allow the tabs 75c to abut the other portions of the cam gear 73.

The action of the cam gear 73 and the rack drive gear 75 will be described with reference to FIGS. 21 to 23.

FIG. 21 shows a state in which the lens barrier device 43 is in the closed state, in other words, the rack gear 63 is positioned on the upper side (see also (a) in FIG. 20). In this state, even when the cam gear 73 rotates in the direction in which the rack gear 63 is moved upward (the direction indicated by the arrow y1 in (a) in FIG. 21 and the arrow y2 in (b) in FIG. 21), the gear portion 75a of the rack drive gear 75 is positioned in the no-tooth portion 73c of the cam gear 73, so that the rack drive gear 75 does not rotate. Further, since the tabs 75cB and 75cC of the rack drive gear 75 slide along the cam portion 73b of the cam gear 73 while supported by (engaging) the cam portion 73b at two respective points, rotation of the rack drive gear 75 due to inertia or other forces will not occur. Therefore, the rack gear 63 does not move upward but stays in position.

FIG. 22 shows a state in which the cam gear 73 in the state shown in FIG. 21 has rotated in the direction in which the lens barrier device 43 transits toward the open state, in other words, in the direction in which the rack gear 63 is moved downward (the direction indicated by the arrow y3 in (a) in FIG. 22 and the arrow y4 in (b) in FIG. 22). In this state, one of the wide teeth 73zA (second teeth 73x) adjacent to the no-tooth portion 73c of the cam gear 73 starts engaging the gear portion 75a of the rack drive gear 75, so that the rack drive gear 75 starts rotating. At this point, the tab 75cB of the rack drive gear 75 is separated from the cam portion 73b, and the tab 75cC enters the area where no cam portion 73b is disposed, so that the tabs 75c allow the rack drive gear 75 to rotate.

FIG. 23 shows a state in which the cam gear 73 in the state shown in FIG. 22 has further rotated in the direction indicated by the arrows y3 and y4 and the lens barrier device 43 has transited to the open state, in other words, the rack gear 63 is positioned on the lower side. In this state, the gear portion 75a of the rack drive gear 75 is positioned in the no-tooth portion 73c of the cam gear 73, so that no power is transmitted from the cam gear 73. Further, since the tabs 75cA and 75cB slide along the cam portion 73b of the cam gear 73 while supported by the cam portion 73b at two respective points, rotation of the rack drive gear 75 due to inertia or other forces will not occur. Therefore, the rack gear 63 does not move downward but stays in position.

The central tab 75cB of the three tabs 75c is used both in the open and closed states. The lens barrier device 43 transits from the open state to the closed state in the same manner as the lens barrier device 43 transits from the closed state to the open state. That is, when the cam gear 73 rotates in the direction opposite to the arrows y3 and y4, the cam gear 73 and the rack drive gear ~75 transit from the state shown in FIG. 23 through the state shown in FIG. 22 to the state shown in FIG. 21.

Figure 25:
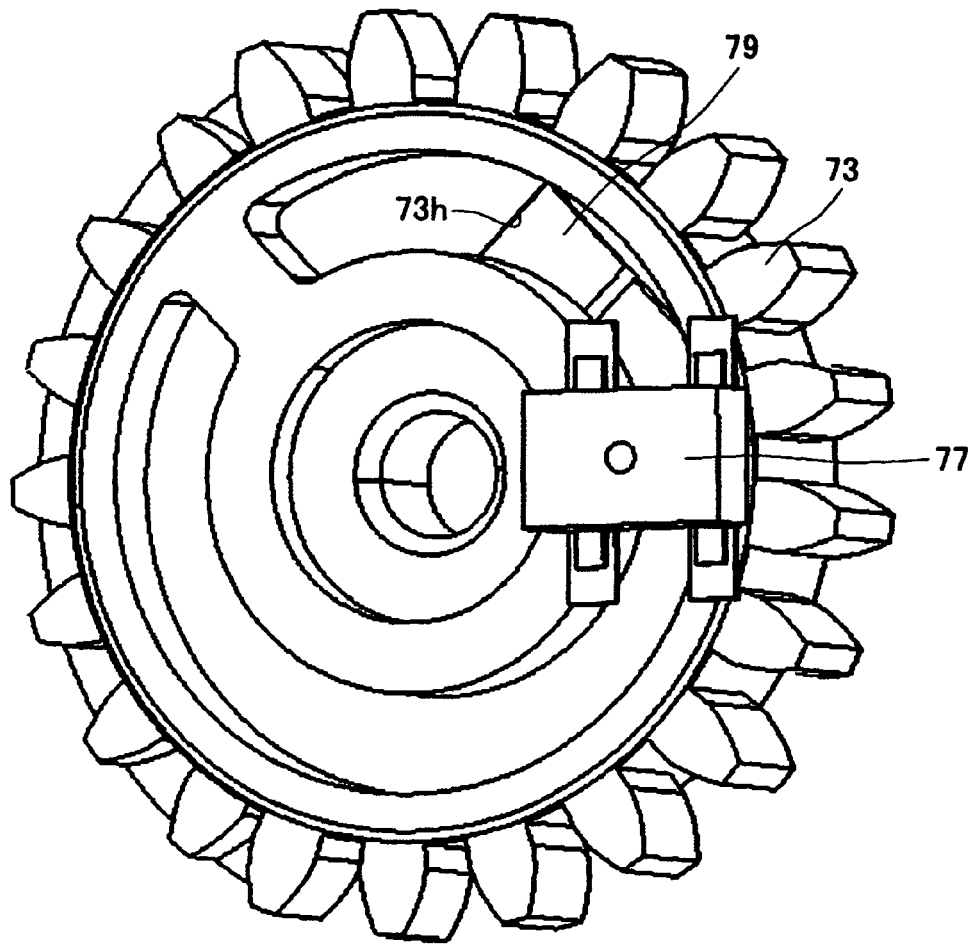
FIG. 25 is a perspective view explaining how to detect the position of the gear train shown in FIG. 20.

FIG. 25 is a perspective view explaining how to detect the position of the gear train 49. The lens barrier device 43 has, for example, a sensor 77 that detects the angular position of the cam gear 73 in order to detect the position of the gear train 49 and hence the positions of the rack gear 63 and the driving blade 45.

The sensor 77 is formed of, for example, a Hall-effect sensor provided in the FPC assembly 53 (FIG. 11), and disposed in a position spaced apart from the axis of rotation of the cam gear 73 by a predetermined distance in such a way that the sensor 77 faces the surface of the cam gear 73 that faces the center base 57 side. On the other hand, a hole 73h (see also (b) in FIG. 21) passing through the cam gear 73 in direction of the axis of rotation is provided in a position spaced apart from the axis of rotation by the predetermined distance, and a magnet 79 is provided in the hole 73h. The magnet 79 is provided in such a way that one end thereof in the circumferential direction (tangential direction) of the cam gear 73 is the north pole and the other end is the south pole. At the same time, the magnet 79 is provided in such a way that one of the north and south poles faces the sensor 77 in the closed state shown in FIG. 21, whereas the other one of the north and south poles faces the sensor 77 in the open state shown in FIG. 23. Therefore, when the sensor 77 detects the north or south pole, the position of the cam gear 73 in the open or closed state is detected. The magnet 79 is attached to the cam gear 73, for example, by means of bonding or snap fitting.

Figure 26:
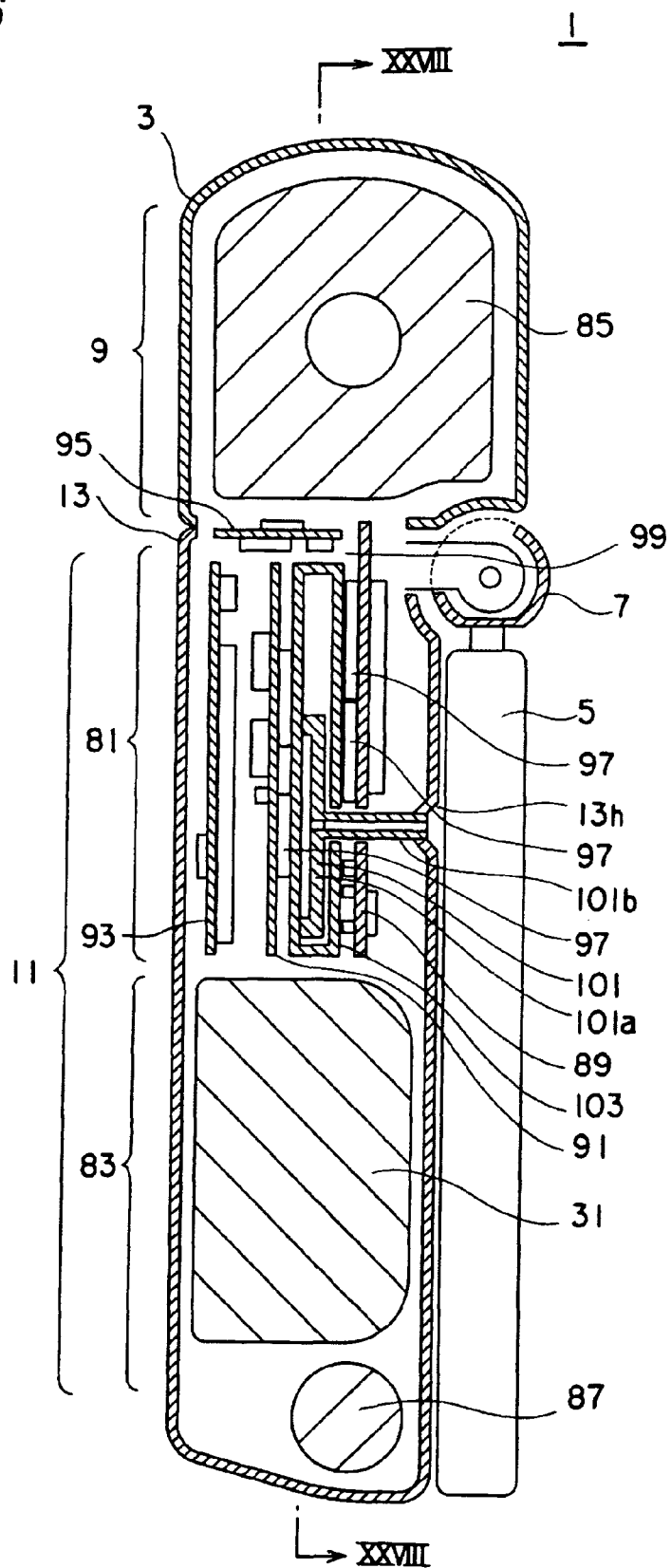
FIG. 26 is a diagrammatic cross-sectional view taken along the line XXVI-XXVI shown in FIG. 2B.

FIG. 26 is a diagrammatic cross-sectional view taken along the line XXVI-XXVI shown in FIG. 2B. FIG. 26 also shows, for ease of description, members that are not originally included in the cross-sectional view taken along the line XXVI-XXVI.

As described above, the body section 3 of the video camera 1 has the lens portion 9 and the grip portion 11. Since a lens barrel 85 that holds the lens 41 is disposed in the lens portion 9, it is difficult to provide in the housing a large space in which a circuit board and other components are provided. Further, since the battery 31, a capacitor 87 used to fire a flash, and other components are disposed in a lower portion 83 located on the lower side of the body section 3, it is difficult to provide in the housing a large space in which a circuit board and other components are provided. As a result, a plurality of circuit boards are densely packed in a central portion 81 located at the center of the body section 3 (the upper portion of the grip portion 11).

Specifically, in the central portion 81 are disposed a plurality of stacked circuit boards (a first circuit board 89, a second circuit board 91, and a third circuit board 93) that face the right and left sides of the video camera 1 as well as a fourth circuit board 95 facing the upper and lower sides and located on the lens portion 9 side. The first to third circuit boards 89, 91, 93, for example, take up an area extending in the up-down and front-rear directions in the grip portion 11.

In the central portion 81 where the circuit boards are densely packed, the video camera 1 has the following configuration in order to efficiently cool a plurality of electronic parts 97 mounted on the circuit boards.

Figure 27:
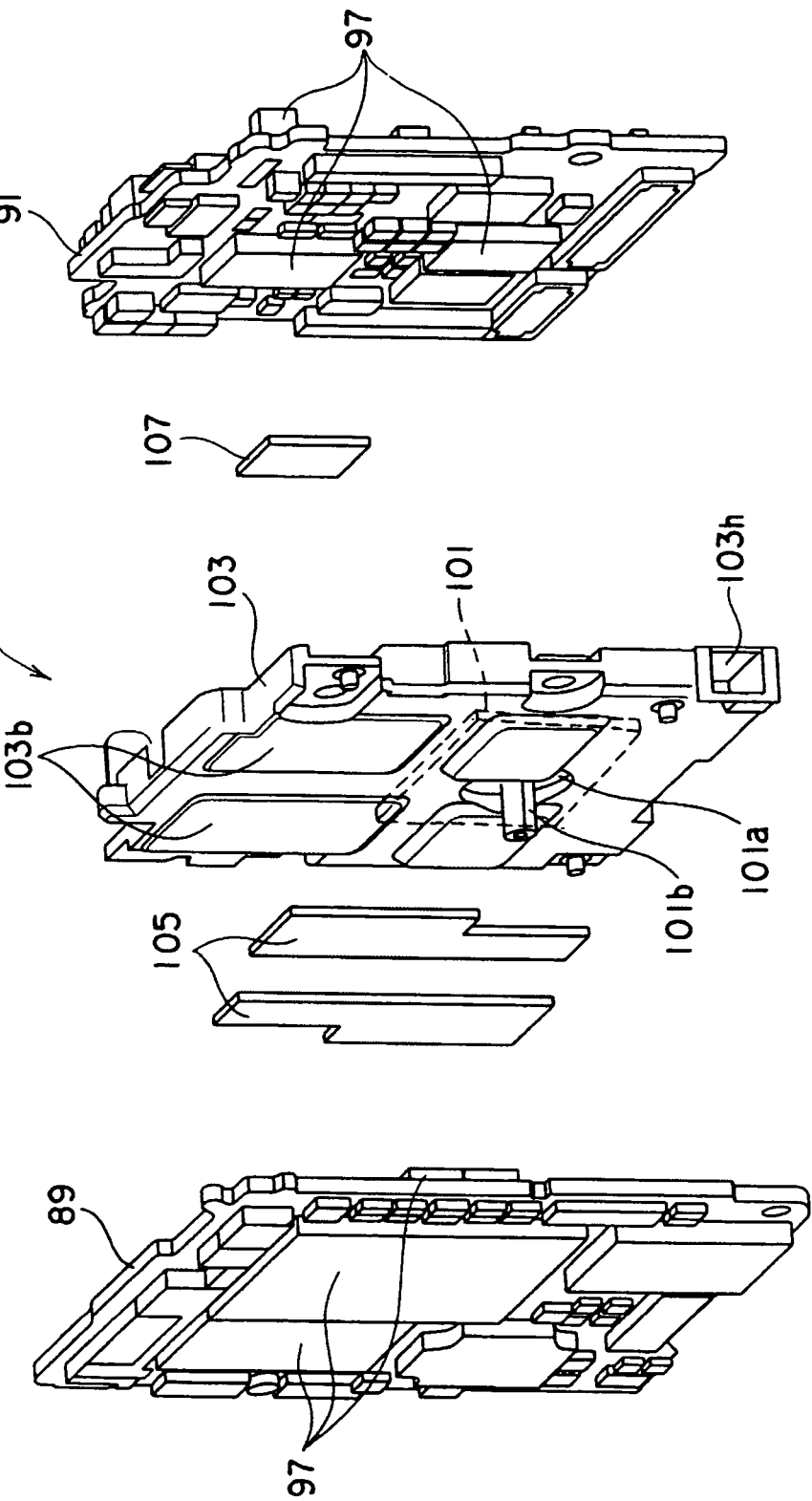
FIG. 27 is an exploded perspective view explaining a cooling structure in the video camera shown in FIGS. 1A and 1B.

FIG. 27 is an exploded perspective view of part of the members in the central portion 81 in the body housing 13. The left side in the plane of view of FIG. 27 is the display section 5 side (the right side in the plane of view of FIG. 26).

Each of the first and second circuit boards 89, 91 is formed of, for example, a rigid-type printed wiring board primarily made of a hard resin, and a plurality of electronic parts 97 are mounted on both sides. The plurality of electronic parts 97 are, for example, ICs. The plurality of electronic parts 97, for example, form a video image signal processing circuit 113 (see FIG. 29) that perform imaging processes carried out in the video camera 1 and a controller 111 (see FIG. 29), and generate heat when the video camera 1 is in operation.

A pump block 99 is provided between the first circuit board 89 and the second circuit board 91. The pump block 99 includes a pump 101 that sucks and discharges air (see also FIG. 26), a duct 103 that houses the pump 101 and forms an air flow path (see also FIG. 26), a first sheet 105 sandwiched between the duct 103 and the first circuit board 89, and a second sheet 107 sandwiched between the duct 103 and the second circuit board 91.

The pump 101 is formed of, for example, a piezoelectric pump, and includes a piezoelectric device (not shown) and a pump housing 101*a* that houses the piezoelectric device. When a voltage is applied to the piezoelectric device, the resultant vibration of the piezoelectric device causes air to be sucked into the pump housing 101*a* and discharged therefrom. The pump housing 101*a* includes a substantially box-shaped, thin portion housed in the duct 103 and a discharge tube 101*b* protruding from the box-shaped portion toward the first circuit board 89. As shown in FIG. 26, the discharge tube 101*b* protrudes outside the duct 103, passes through the first circuit board 89, and communicates with an area outside the body housing 13 through a discharge opening 13*h* (see also FIGS. 1A and 1B) that is open through the surface on which the display section 5 is overlaid.

The duct 103 has, for example, a thin box-like shape having a size comparable to those of the first and second circuit boards 89, 91, and is stacked on both the first and second circuit boards 89, 91. An intake opening 103*h* for sucking air is formed in the side of the duct 103 that faces the rear side of the video camera 1 (on the front side in the plane of view of FIG. 27). The duct 103 is made of, for example, a metal or other materials having a high heat transfer rate. The duct 103 may also serve as a shield that traps noise generated in the pump 101 by connecting the duct 103 to a ground line in the first circuit board 89 or other circuit boards.

Each of the first and second sheets 105, 107 is formed of, for example, an elastic member. An example of the elastic member is a silicon rubber. The first and second sheets 105, 107 are sandwiched between the duct 103 and the electronic parts 97 and come into close contact (surface contact) therewith. The heat generated in the electronic parts 97 is thus efficiently transferred to the duct 103. The first and second sheets 105, 107 are sandwiched between the duct 103 and the electronic parts 97 and come into close contact therewith, for example, by attaching the first and second sheets 105, 107 to the duct 103 or the electronic parts 97 by means of adhesive or other fixing members and assembling the video camera 1.

The surfaces of the duct 103 that face the first and second circuit boards 89, 91 have a plurality of protrusions 103*b* having flat top surfaces, each of the protrusions 103*b* having a flat shape substantially the same as the flat shape of one of the electronic parts 97 or the flat shape of grouped electronic parts 97. The plurality of protrusions 103*b* are formed in such a way that the distances between the plurality of electronic parts 97 and the plurality of protrusions 103*b* are the same. Therefore, the first and second sheets 105, 107 can be common to the plurality of electronic parts 97.

Figure 28:
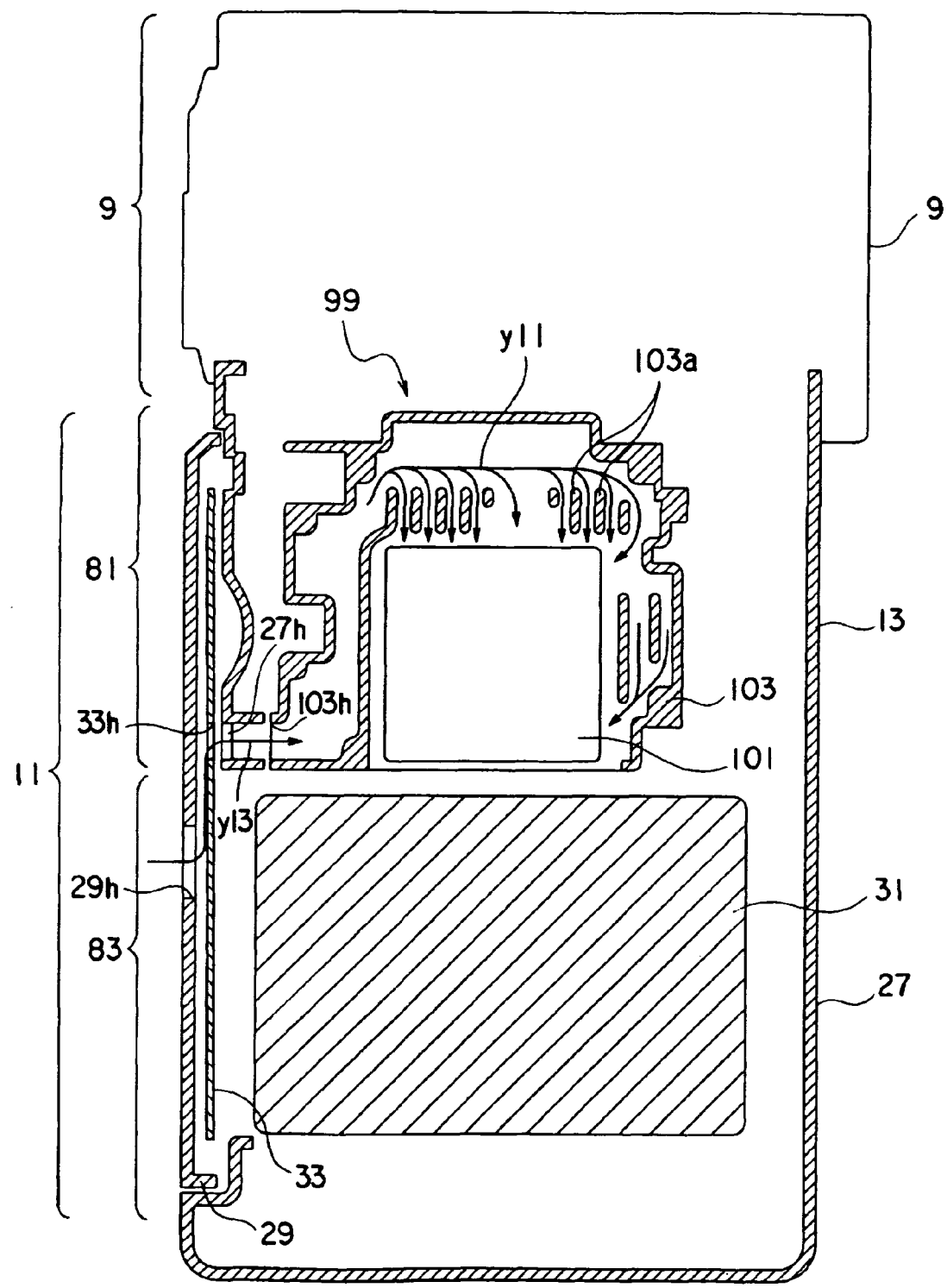
FIG. 28 is a diagrammatic cross-sectional view taken along the line XXVIII-XXVIII shown in FIG. 26.

FIG. 28 is a diagrammatic cross-sectional view taken along the line XXVIII-XXVIII shown in FIG. 26. The left side in the plane of view of FIG. 28 is the rear of the video camera 1 (the lid 29 side).

An air flow path through which the air sucked by the pump 101 flows is formed in the duct 103, as indicated by the arrows y11. The duct 103 has a plurality of fins 103*a* protruding into the flow path and disposed along the flow path. The plurality of fins 103*a* are arranged or extend along the periphery of the pump 101 and contribute to formation of the flow path through which air flows around the pump 101.

The pump block 99 takes air from an area outside the body housing 13 through the rear side of the video camera 1, as indicated by the arrow y13. A specific description will follow:

As shown in FIGS. 2A, 2B and 28, an intake opening 29*h* is formed through the lid 29. The intake opening 29*h* is disposed, for example, in the portion of the grip portion 11 that is located on the display section 5 side and on the lower side, whereby the right hand of the camera operator that grips the grip portion 11 unlikely blocks the intake opening 29*h* in the basic usage mode. The intake opening 29*h*, for example, has a slit-like shape extending in the up-down direction.

As shown in FIGS. 3 and 28, a plate-like portion of the hinge member 33 faces the inner surface of the lid 29, and the gap between the plate-like portion and the lid 29 forms a flow path. A communication hole 33*h* is formed in the hinge member 33 in a portion above the intake opening 29*h* (on the pump block 99 side), and a communication hole 27*h* is formed in the portion of the body housing main portion 27 of the body housing 13 that faces the communication hole 33*h*. The communication hole 27*h* faces the intake opening 103*h* in the duct 103, as shown in FIG. 28.

Therefore, air outside the body housing 13 is taken into the duct 103 through the intake opening 29*h*, the gap between the lid 29 and the hinge member 33, the communication hole 33*h*, the communication hole 27, and the intake opening 103*h*. In such a configuration, the intake opening 29*h* can be disposed at an appropriate position that is unlikely blocked by the camera operator without increasing the number of parts.

Forming a relatively small intake opening 29*h* allows the flow rate at the intake opening 29*h* to be increased and cooler outside air to be sucked instead of air near the body section 3 heated by the body section 3. The heat transfer rate in the pump block 99 can thus be increased.

Figure 29:
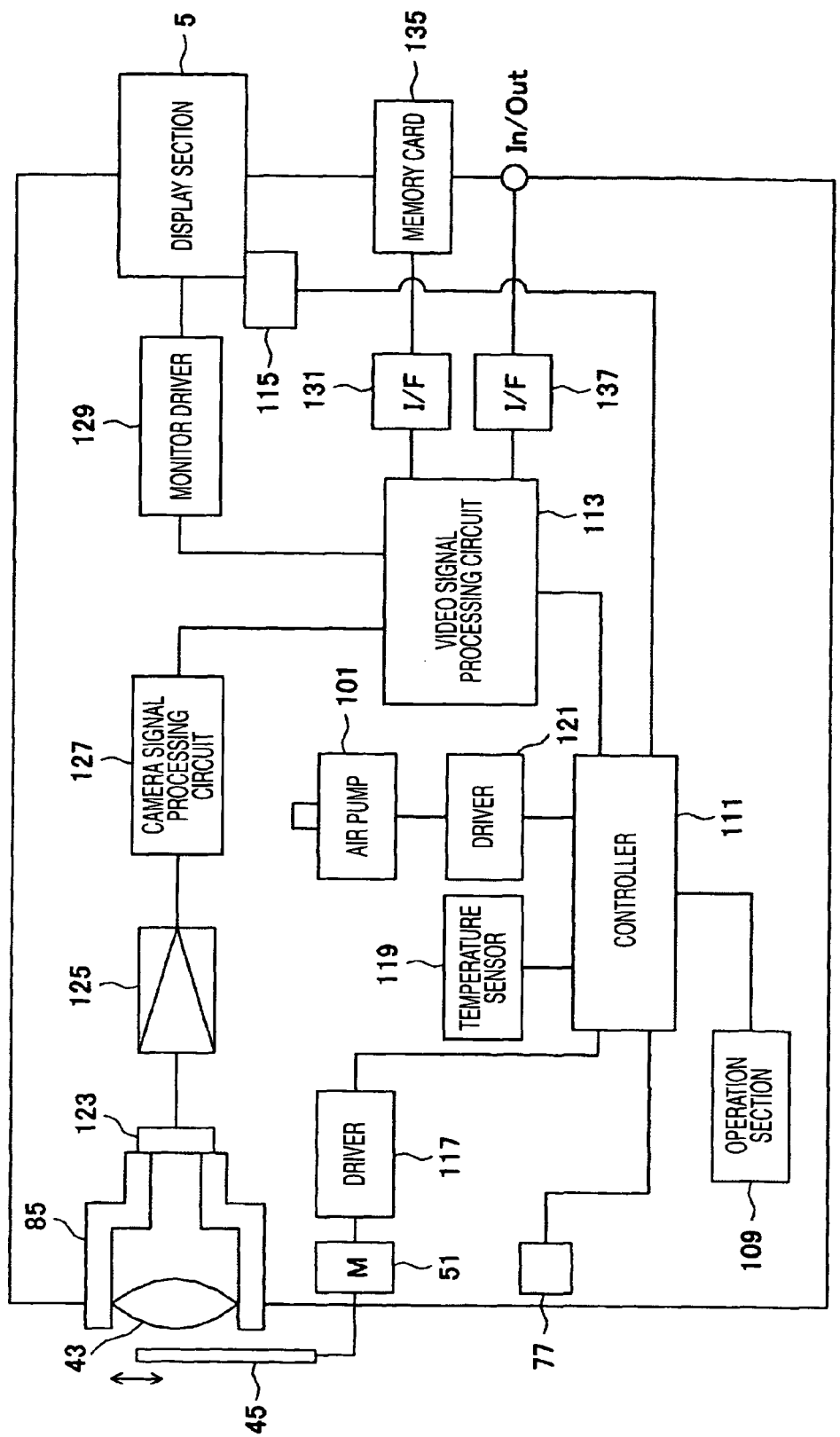
FIG. 29 is a block diagram showing the configuration of a signal processing system of the video camera shown in FIGS. 1A and 1B.

FIG. 29 is a block diagram showing the configuration of a signal processing system of the video camera 1.

The video camera 1 includes the controller 111 that controls the operation of the entire video camera 1 based on signals from an operation section 109 including the recording button 19 and the release button 25, and the video signal processing circuit 113 that performs imaging processes. The controller 111 and the video signal processing circuit 113 are formed of, for example, the electronic parts 97 (ICs) mounted on the first and second circuit boards 89, 91 and other circuit boards.

The controller 111 controls the operation of the motor 51 through a motor driver 117 based on a signal from the sensor 115, which detects the open/close state of the display section 5, for example, in such a way that the lens barrier device 43 is in the open state when the display section 5 is in the open state, whereas the lens barrier device 43 is in the closed state when the display section 5 is in the closed state. The controller 111 detects the position of the cam gear 73 in the open and closed states based on the detection signal from the sensor 77 and controls the position of the motor 51.

The controller 111 further controls the operation of the pump 101 through a driver 121, for example, based on signals from the operation section 109 and the detection result from a temperature sensor 119. The temperature sensor 119 is provided, for example, in the central portion 81 in the body housing 13, and detects the temperature around the electronic parts 97 on the circuit boards densely disposed in the central portion 81.

The lens 41 focuses light on a light receiving surface of a light receiving devise 123, such as a CCD. The light receiving devise 123 outputs an electric signal according to the received light to a camera signal processing circuit 127 via an amplifier 125. The camera signal processing circuit 127 converts the electric signal from the light receiving devise 123 into a video signal in a predetermined format, and outputs it to the video signal processing circuit 113. Based on a control signal from the controller 111 that is based on signals from the operation section 109 and other signals, the video signal processing circuit 113 processes video images based on the video signal from the camera signal processing circuit 127. Example of such processing include displaying the video images on the display section 5 via a monitor driver 129, recording the video images on the memory card 135 via an interface 131, and outputting the video images to other apparatus, such as a television and a projector, via an interface 137.

Figure 30:
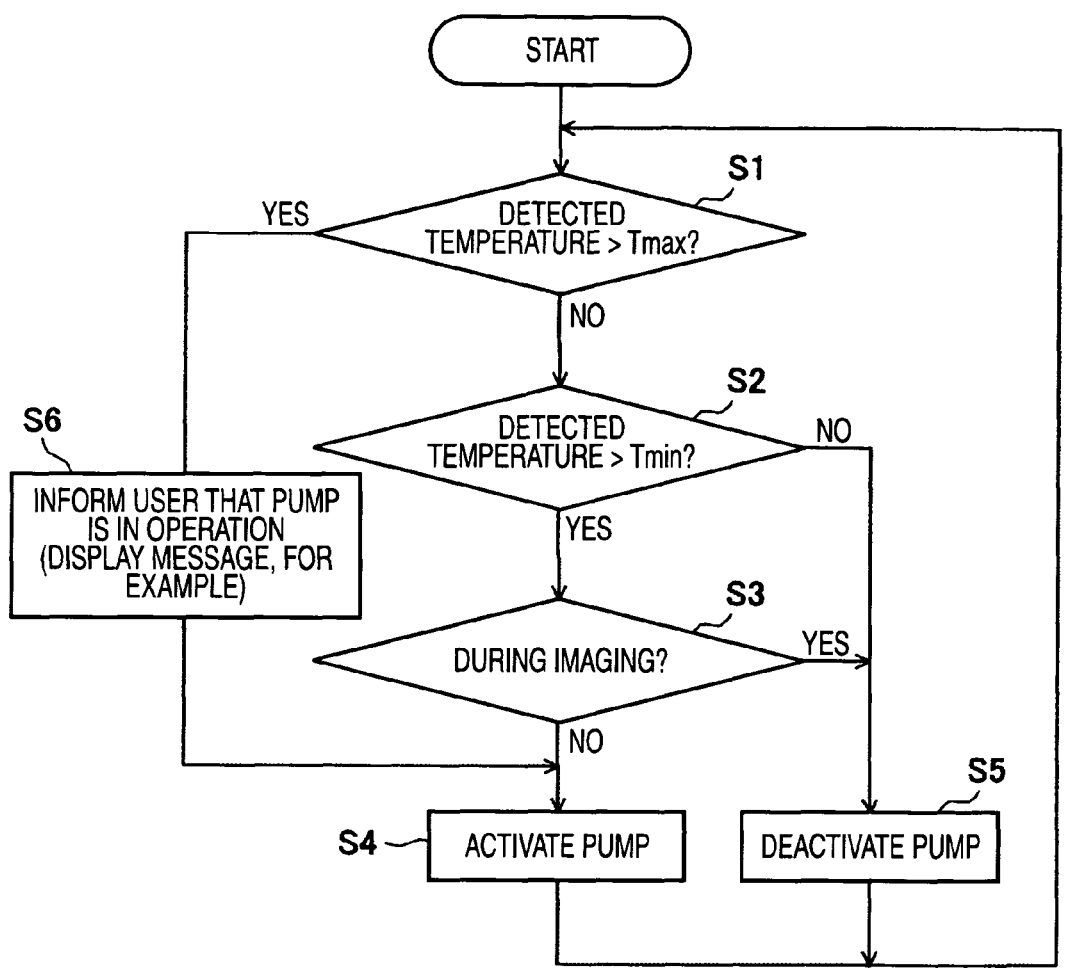
FIG. 30 is a flowchart showing a procedure of processes carried out by a controller shown in FIG. 29 to control a pump.

FIG. 30 is a flowchart showing a procedure of processes carried out by the controller 111 to control the pump 101. The processes are carried out, for example, during the period from the time when the video camera 1 is turned on to the time when the video camera 1 is turned off.

In the step S1, the controller 111 judges whether or not the temperature detected by the temperature sensor 119 is higher than a predetermined maximum allowable temperature Tmax. The maximum allowable temperature Tmax is, for example, a value that is preset by the manufacturer of the video camera 1 and held in the controller 111, and indicates a point to which the temperature around the temperature sensor 119 should not reach. When the controller 111 judges that the detected temperature is higher than the maximum allowable temperature Tmax, the control proceeds to the step S4 via the step S6, and the controller 111 activates the pump 101 or instructs the pump 101 to keep operating. When the controller 111 judges that the detected temperature is not higher than the maximum allowable temperature Tmax, the control proceeds to the step S2. The step S6 will be described later.

In the step S2, the controller 111 judges whether or not the temperature detected by the temperature sensor 119 is higher than a recommended cooling temperature Tmin. The recommended cooling temperature Tmin is, for example, a value that is preset by the manufacturer of the video camera 1 and held in the controller 111. The recommended cooling temperature Tmin is lower than the maximum allowable temperature Tmax but is a temperature at which the pump 101 is preferably driven to start cooling the electronic parts 97. When the controller 111 judges that the detected temperature is not higher than the recommended cooling temperature Tmin, the control proceeds to the step S5, and the controller 111 deactivates the pump 101 or instructs the pump 101 to stay halted. When the controller 111 judges that the detected temperature is higher than the recommended cooling temperature Tmin, the control proceeds to the step S3.

In the step S3, the controller 111 judges whether or not video images are currently being captured. Since the controller 111 controls the operation of the entire video camera 1 based on signals from the operation section 109, the judgment described above is made by referring to flags or other parameters that relates to respective control operations. The state in which video images are being captured is a state in which images are focused on the light receiving devise 123 and image processing is continuously performed based on the signal from the light receiving devise 123. Such state includes not only a state in which the video images are recorded on the memory card 135 or other recording media, but also a state in which video images are not recorded but displayed on the display section 5 or outputted to other apparatus. In the step S3, a judgment may be alternatively made as to whether or not video images are being recorded.

When the controller 111 judges in the step S3 that images are not being captured, the control proceeds to the step S4, and the controller 111 activates the pump 101 or instructs the pump 101 to keep operating. When the controller 111 judges that images are being captured, the control proceeds to the step S5, and the controller 111 deactivates the pump 101 or instructs the pump 101 to stay halted. Deactivating the pump 101 when images are being captured, for example, prevents operation noise of the pump 101 from being recorded.

However, as described above, when the detected temperature is higher than the maximum allowable temperature Tmax, the pump 101 is activated even when images are being captured. In the step S6, the controller 111 informs the camera operator of information on the operation of the pump 101. For example, the controller 111 informs the camera operator that the pump 101 is in operation by displaying a message on the display section 5 or turning on an LED disposed in an appropriate position. When a message is displayed on the display section 5, the message may not only inform the camera operator that the pump 101 is in operation, but also, for example, explain as appropriate that the pump 101 is only temporarily operated to cool the electronic parts 97. Displaying such information on the operation of the pump 101 allows the camera operator to understand that the operation noise of the pump 101 may be disadvantageously recorded.

The steps S1 to S4 are carried out at relatively short intervals (0.1 second, for example). The flowchart in FIG. 30 shows a summary of the operation of the controller 111, and may be modified as appropriate. For example, when the judgment in the step S1 is made every time, the activation and deactivation of the pump 101 could be frequently repeated when the temperature detected by the temperature sensor 119 falls in the vicinity of the maximum allowable temperature Tmax or the recommended cooling temperature Tmin. To avoid such situations, once the detected temperature becomes higher than the maximum allowable temperature Tmax or other temperatures, the pump 101 may be operated for a fixed period irrespective of the magnitude of the detected temperature, or a blind area in which the temperature sensor 119 is not active may be provided by changing the maximum allowable temperature Tmax or other temperatures to a lower value.

The embodiment described above provides an advantageous effect from a first point of view, that is, an electronic apparatus with a variety of housing connecting structures. A specific description follows:

The video camera 1 includes the body housing 13, the display housing 15, and the connecting section 7 that connects the display housing 15 to the body housing 13 in such a way that the display housing 15 can be folded onto the body housing 13 around the first axis of rotation RA1 from the open state to the closed state and the display housing 15 can be rotated relative to the body housing 13 around the second axis of rotation RA2 that is perpendicular to the first axis of rotation RA1. The first axis of rotation RA1 is positioned outside the body housing 13 and the display housing 15. Such a configuration allows a housing connecting structure that has not been achieved in related art to be provided. As a result, for example, it is possible to expose ends of the connecting housing 17 through which the first axis of rotation RA1 passes outside the body housing 13 and the display housing 15, and provide the release button 25 on one of the ends to improve ease of use.

The connecting section 7 has the connecting housing 17 connected to the body housing 13 to be rotatable around the first axis of rotation RA1 and perpendicular to the second axis of rotation RA2. The connecting housing 17 has a tubular shape extending in the axial direction of the first axis of rotation RA1. Ends of the connecting housing 17 through which the first axis of rotation RA1 passes are exposed outside the body housing 13 and the display housing 15. The connecting section 7 has a D-like cross-sectional shape perpendicular to the first axis of rotation RA1 and has the flat portion 7a that is perpendicular to the second axis of rotation RA2 and faces the display housing 15. Therefore, the connecting housing 17 has a shape that follows movement directions relative to the body housing 13 and the display housing 15. In other words, the connecting housing 17 has a shape suitable to opening, closing, and rotating operations performed in the video camera 1, and allows the entire size of the video camera 1 to be reduced and the display housing 15 to be located close to the body housing 13 in the open and rotated states.

The characters "PHOTO" as a mark indicative of information on the release button 25 are provided on the flat portion 7a of the connecting housing 17. In the closed state, the characters "PHOTO" face the display housing 15 and are hidden behind the display housing 15, whereas the characters "PHOTO" are exposed when the display housing 15 transits from the closed state to the open state and is rotated around the second axis of rotation RA2 relative to the body housing 13. Therefore, a novel external appearance is achieved in which guidance is given about the operation of the release button 25 in the situation in which the release button 25 is used.

The protective member 37 as a protective member whose hardness is lower than that of the display housing 15 is provided on the surface of the display housing 15 that faces the connecting section 7 in the axial direction of the second axis of rotation RA2. Therefore, in the connecting structure of the present embodiment in which the display housing 15 can be located close to the body housing 13, a risk of scratching the body housing 13 when the display housing 15 abuts the body housing 13 can be reduced. Further, since the connecting housing 17 has a D-like shape, the protective member 37 is unlikely visible, and preferably fills the gap between the connecting housing 17 and the display housing 15 to improve external appearance.

The body housing 13 includes a recess (the portion of the grip portion 11 that is located on the display section 5 side) in which the display housing 15 is disposed in the closed state, and a protrusion formed by forming the recess (the portion of the lens portion 9 that is located on the display section 5 side). The protective member 37 made of a material whose hardness is lower than that of the lens portion 9 of the body housing 13 is provided to be functional as a spacer between the display housing 15 and the lens portion 9 in the axial direction of the second axis of rotation RA2 when the display housing 15 in the open state is rotated around the second axis of rotation RA2 relative to the body housing 13. Therefore, the lens portion 9 of the body housing 13 is unlikely scratched. Even when the protective member 37 is scratched, the beautifully finished external appearance of the video camera 1 is unlikely degraded because the protective member 37 is unlikely visible.

The embodiment described above provides an advantageous effect from a second point of view, that is, an imaging apparatus and an open/close device with a small blade-accommodating space. A specific description follows:

The video camera 1 includes the lens 41, the driving blade 45 as a first blade slidable between a covering position where the driving blade 45 covers the front side of the lens 41 and a retract position where the driving blade 45 retracts from the front side of the lens 41, and the driven blade 47 as a second blade pivotally supported by the driving blade 45, the driven blade 47 moving along with the driving blade 45 between the covering position and the retract position in response to the slide motion of the driving blade 45, the driven blade 47 rotating relative to the driving blade 45 in such a way that the driven blade 47 more largely overlaps with the driving blade 45 in the retract position than in the covering position. It is therefore neither necessary to prepare an accommodating space having a size comparative to the sizes of the blades (45, 47), nor provide a pivotal point around which the driving blade 45 rotates. The size of the blade-accommodating space can thus be reduced.

The video camera 1 includes the spring 61 as an urging member that urges the driving blade 45 and the driven blade 47 in the direction in which they are separated from each other, and the side wall 57bb as an abutting portion that abuts the driven blade 47 in such a way that when the driving blade 45 and the driven blade 47 move from the covering position to the retract position, the driven blade 47 rotates against the urging force of the spring 61 in the direction in which the driven blade 47 overlaps with the driving blade 45. Therefore, a drive force that rotates the driven blade 47 can be obtained in a simple configuration.

Since the driving blade 45 does not rotate but linearly slides between the covering position and the retract position, the configuration becomes simple and it is not necessary to provide a space in which the driving blade 45 can rotate.

The video camera 1 includes the body housing 13 that houses the lens 41, the driving blade 45, and the driven blade 47. When viewed from the front of the lens 41, the body housing 13 includes the lens portion 9 (a portion that forms the lens portion 9) as a first configured portion that houses the lens 41, and the grip portion 11 (a portion that forms the grip portion 11) as a second configured portion adjacent to the lens portion 9. The grip portion 11 has a width smaller than that of the lens portion 9 in the direction (right-left direction) perpendicular to the direction (the up-down direction) in which the lens portion 9 and the grip portion 11 are arranged. The grip portion 11 is shifted toward one side in the right-left direction with respect to the lens 41 (the side opposite the display section 5). The driving blade 45 and the driven blade 47 are configured in such a way that in the covering position, the driving blade 45 is positioned on the side opposite the display section 5 in the right-left direction and the driven blade 47 is positioned on the display section 5 side in the right-left direction, and when moving from the covering position to the retract position, the driving blade 45 and the driven blade 47 move from the lens portion 9 side to the grip portion 11 side in such a way that the rotation of the driven blade 47 reduces the width of the driving blade 45 and the driven blade 47 as a whole in the right-left direction on the side opposite the display section 5. Therefore, the preferable motion of the driving blade 45 and the driven blade 47 allows the size of the body housing 13 (grip portion 11) to be reduced even when the diameter of the lens 41 is large.

The video camera 1 includes the display housing 15 as another housing connected to the body housing 13 in such a way that the display housing 15 can transit between the closed state in which the display housing 15 is overlaid on the surface of the grip portion 11 on the display section 5 side and the open state in which the display housing 15 moves away from the grip portion 11. The body housing 13 and the display housing 15 are configured in such a way that in the closed state, the lens portion 9 and the grip portion 11 form a flat surface parallel to the up-down direction on the side opposite the display section 5, whereas the lens portion 9 and the display housing 15 form a flat surface parallel to the up-down direction on the display section 5 side. Therefore, the preferable motion of the driving blade 45 and the driven blade 47 allows the shape in the accommodated state to be simplified and more compact.

In the driving blade 45, the blade body 45a that covers the front side of the lens 41 is formed in such a way that, when viewed from the front of the lens 41, the width closer to the grip portion 11 in the right-left direction side becomes smaller on the side opposite the display section 5. In the retract position, the portion of the blade body 45a on the wider side is accommodated in the lens portion 9 and the portion of the blade body 45a on the narrower side is accommodated in the grip portion 11. In the driven blade 47, the blade body 47a that covers the front side of the lens 41 is formed in such a way that, when viewed from the front of the lens 41, the width closer to the lens portion 9 in the right-left direction becomes smaller on the display section 5 side. When moving from the covering position to the retract position, the blade body 47a rotates around a point located on the grip portion 11 side. Therefore, a space where the blades (45, 47) are accommodated in the grip portion 11 can be reduced. That is, since the wider portion of the driving blade 45 is accommodated in the lens portion 9, the grip portion 11 does not need to have a width comparable to that of the driving blade 45. When the driven blade 47 rotates, since the amount of movement of the portion closer to the tip of the driven blade 47 is greater than the amount of movement of the portion closer to the axis of rotation of the driven blade 47, it is difficult to provide in the housing a space in which the portion closer to the tip of the driven blade 47 can move. However, since the width of the portion closer to the tip of the driven blade 47 is smaller, a space in which the portion closer the tip of the driven blade 47 can move is more readily provided, and hence the amount of movement of the entire driven blade 47 can be increased. As a result, the driven blade 47 more readily overlaps with the driving blade 45, and the width of the grip portion 11 is more readily reduced.

The video camera 1 includes the motor 51 as a drive power source, the rack gear 63 as a driven member that is driven by the power of the motor 51, and the spring 65 as an elastic member that connects the rack gear 63 to the driving blade 45. It is therefore possible to reduce impact produced, for example, when a foreign body is caught as described above.

The video camera 1 includes the motor 51, and the cam gear 73 and the rack drive gear 75 that can engage each other and transmit the power of the motor 51 to the driving blade 45. At least one of the cam gear 73 and the rack drive gear 75 (the cam gear 73 in the present embodiment) has the non-tooth portion 73c so that the cam gear 73 and the rack drive gear 75 disengage from each other when the driving blade 45 is positioned in at least one of the covering position and the retract position (both in the present embodiment). Of the cam gear 73 and the rack drive gear 75, the cam gear 73 as a gear on the motor 51 side has the cam portion 73b that protrudes outward in the radial direction and extends over the range in which the non-tooth portion 73c is disposed in the circumferential direction. Of the cam gear 73 and the rack drive gear 75, the rack drive gear 75 as a gear on the driving blade 45 side has tabs 75c as locking portions that are slidably locked in the circumferential direction on the surface of the cam portion 73b along the circumferential direction so as to restrict the rack drive gear 75 from rotating. Therefore, the influence of errors in motor control and mechanical errors including the cam gear 73 and the rack drive gear 75 is reduced to accurately control the positions of the driving blade 45 and the driven blade 47.

The embodiment described above provides an advantageous effect from a third point of view, that is, an electronic apparatus in which electronic parts can be preferably cooled. A specific description follows:

The video camera 1 includes the body housing 13, the first and second circuit boards 89, 91 disposed in such a way that they are stacked on each other in the body housing 13, and the pump block 99 that is disposed between the circuit boards, the pump block 99 abutting the electronic parts 97 mounted on the first circuit board 89 and the electronic parts 97 mounted on the second circuit board 91, the pump block 99 sucking air outside the body housing 13 and discharging the air out of the body housing 13. Therefore, the circuit boards in the body housing 13 can be directly and efficiently cooled without depending on heat diffusion through the body housing 13.

That is, since the pump block 99 is disposed between the two circuit boards, both sides of the pump block 99 receive heat generated in the circuit boards. Therefore, the temperature of the pump block 99 readily increases, and heat is readily transferred to the air. Further, the heated pump block 99 is disposed in a central portion of the body housing 13 and spaced apart from the body housing 13. In this case, the body housing 13 will not directly be exposed to the heat from the pump block, and hence can be maintained at low temperatures.

The pump block 99 includes the pump 101, the duct 103 that houses the pump 101 and has the fins 103a that protrude into the space that houses the pump 101, the first sheet 105 as a first heat transfer member that is sandwiched between the duct 103 and the electronic parts 97 on the first circuit board 89 and in close contact therewith, and the second sheet 107 as a second heat transfer member that is sandwiched between the duct 103 and the electronic parts 97 on the second circuit board 91 and in close contact therewith. Therefore, heat can be broadly and efficiently exchanged between the air and the electronic parts 97.

The first and second circuit boards 89, 91 are stacked on each other and face a predetermined surface of the body housing 13 (the surface on which the display section 5 is overlaid). The duct 103 forms a flow path that follows the first and second circuit boards 89, 91. The pump 101 has the discharge tube 101b for discharging the air sucked through the flow path in the duct 103, the discharge tube 101b extending in the direction in which the first and second circuit boards 89, 91 are stacked (in the right-left direction) and toward the predetermined surface of the body housing 13 and passing through the duct 103 and the first circuit board 89. The discharge opening 13h is formed in a predetermined surface of the body housing 13 and connected to the discharge tube 101b. Therefore, heat exchange between the sucked air and the circuit boards is efficiently carried out through the duct 103, and the heated air can be directly discharged out of the body housing 13 through the discharge tube 101b without causing the heated air to flow along the first circuit board 89 and other boards, allowing efficient cooling to be carried out. In particular, a preferable cooling can be carried out in a thin housing having a thickness (the width in the right-left direction in the present embodiment) being one-half or smaller than the horizontal and vertical dimensions of the housing.

The video camera 1 includes the lens portion 9 as an imager that captures video images and the controller 111 that controls the sucking and discharging in the pump block 99. The electronic parts 97 generate heat during imaging in the lens portion 9 when the electronic parts 97 perform processes that relate to the imaging. The controller 111 restricts the sucking and the discharging in the pump block 99 during imaging in the lens portion 9 as compared to a non-imaging period. Therefore, acoustic noise and electric noise due to the operation of the pump block 99 will not be introduced.

An electronic apparatus and an imaging apparatus to which the invention is applied are not limited to video cameras. For example, the invention may also be applied to mobile phones, digital cameras, notebook personal computers, PDAs, and game consoles. Further, the invention may be applied to electronic apparatus with no imaging capability. Open/close devices (the lens barrier device 43 in the present embodiment) to which the invention is applied are not limited to those for protecting a lens. For example, the invention may be applied to a shuttering device that opens and closes a light path, a light attenuating filter device, and a device that opens and closes an appropriate opening, such as a vent.

The first blade (the driving blade 45 in the embodiment) is not limited to the one that does not rotate but linearly moves, but may be any other component as long as it can slide, that is, it is not pivotally supported and can slide along a guide, such as a protruding rail and a groove. The first blade may move along a curved path or may rotate while translating.

In an open/close device (the lens barrier device 43 in the embodiment), the urging member (the spring 61 in the embodiment) that urges the blades in the direction in which they are separated from each other, the abutting portion (the side wall 57bb in the embodiment) that abuts the blades in the direction in which the blades overlap, the drive power source (the motor 51 in the embodiment), and other components may not be essential. For example, the urging member may urge the blades in the direction in which they come closer to each other. The abutting portion may abut the blades in the direction in which the blades are unfolded. The urging member may be omitted and a rail or any other similar component is used to control the rotation of the blades. The drive power source may be omitted and the blades may be moved manually.

The pump block is not limited to the one including a pump and a duct that houses the pump. For example, a pump casing itself a may form a duct. Further, the pump is not limited to the one including a piezoelectric device. For example, the pump may be a vane-type pump or a device classified into a so-called blower.

The operation member (the release button 25 in the embodiment) provided at an end of the connecting section is not limited to a push button, but may be a lever or other components. Further, the function of the operation member is not limited to capturing a still image. The mark indicative of information on the operation member (the characters "PHOTO" in the embodiment) is not limited to description of the function of the operation member. For example, the mark may be an operation method and a caution.

The restriction of the cooling pump during imaging based on comparison made during a non-imaging period is not limited to deactivation of the pump. For example, the amount of sucking and discharging during imaging period may be smaller than that during a non-imaging period. A threshold temperature above which the pump is driven and below which the pump is not driven during imaging may be set to a value higher than a value during a non-imaging period.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   a lens;
   a first blade slidable between a first blade covering position where the first blade covers a portion of a front side of the lens and a first blade retract position where the first blade retracts from the portion of the front side of the lens to uncover the portion of the front side of the lens; and
   a second blade pivotally supported by the first blade and movable between a second blade covering position where the second blade covers a remaining portion of the front side of the lens and a second blade retract position where the second blade retracts from the remaining portion of the front side of the lens to uncover the remaining portion of the front side of the lens,
   wherein the first blade does not rotate but linearly slides to and between the first blade covering position and the first blade retract position and, as the first blade moves from the first blade retract position to the first blade covering position, the second blade moves linearly with the first blade and pivots relative to the first blade to move from the second blade retract position to the second blade covering position.

2. The imaging apparatus according to claim 1, further comprising:
   an urging member that urges the first and second blades in the direction in which the first and second blades are separated from each other; and
   an abutting portion that abuts the second blade in such a way that when the first and second blades move from the respective first and second blade covering positions to the respective first and second blade retract positions, the second blade rotates against the urging force of the urging member in the direction in which the second blade overlaps with the first blade.

3. An imaging apparatus comprising:
   a lens;
   a first blade slidable between a covering position where the first blade covers the front side of the lens and a retract position where the first blade retracts from the front side of the lens.
   a second blade pivotally supported by the first blade, the second blade moving along with the first blade between the covering position and the retract position in response to the slide motion of the first blade, the second blade rotating relative to the first blade in such a way that the second blade more largely overlaps with the first blade in the retract position than in the covering position; and a housing that houses the lens and the first and second blades, wherein when viewed from the front of the lens, the housing includes a first configured portion that houses the lens, and a second configured portion adjacent to the first configured portion, the second configured portion has a width smaller than that of the first configured portion in the direction perpendicular to the direction in which the first and second configured portions are arranged, and the second configured portion is shifted toward one side in the perpendicular direction with respect to the lens, and the first and second blades are configured in such a way that in the covering position, the first blade is positioned on the one side in the perpendicular direction and the second blade is positioned on the other side in the perpendicular direction, and when moving from the covering position to the retract position, the first and second blades move from the first configured portion side to the second configured portion side in such a way that the rotation of the second blade reduces the width of the first and second blades as a whole in the perpendicular direction on the one side, wherein the first blade does not rotate but linearly slides between the covering position and the retract position.

4. The imaging apparatus according to claim 3, further comprising:

another housing connected to the housing in such a way that the other housing can transit between a closed state in which the other housing is overlaid on the surface of the second configured portion that is located on the other side and an open state in which the other housing moves away from the second configured portion, wherein the housing and the other housing are configured in such a way that in the closed state, the first and second configured portions form on the one side a flat surface parallel to the arrangement direction, whereas the first configured portion and the other housing form on the other side a flat surface parallel to the arrangement direction.

5. The imaging apparatus according to claim 3, wherein the portion of the first blade that covers the front side of the lens is formed in such a way that, when viewed from the front of the lens, the width closer to the second configured portion in the perpendicular direction becomes smaller on the one side, and in the retract position, part of the portion on the wider side is accommodated in the first configured portion and part of the portion on the narrower side is accommodated in the second configured portion, and the portion of the second blade that covers the front side of the lens is formed in such a way that, when viewed from the front of the lens, the width closer to the first configured portion in the perpendicular direction becomes smaller on the other side, and when moving from the covering position to the retract position, the portion rotates around a point located on the second configured portion side toward the one side.

6. The imaging apparatus according to claim 1, further comprising:

a drive power source;

a driven member that is driven by the power of the drive power source; and an elastic member that connects the driven member to the first blade.

7. The imaging apparatus according to claim 1, further comprising:

a drive power source; and a first gear and a second gear that can engage each other and transmit the power of the drive power source to the first blade, wherein at least one of the first and second gears has a non-tooth portion so that the first and second gears disengage from each other when the first blade is positioned in at least one of the covering position and the retract position, of the first and second gears, the gear on the drive power source side has a cam portion that protrudes outward in the radial direction and extends over the range in which the non-tooth portion is disposed in the circumferential direction, and of the first and second gears, the gear on the first blade side has a locking portion that is slidably locked in the circumferential direction on the surface of the cam portion along the circumferential direction so as to restrict the gear from rotating.

8. An open/close device comprising:

a first blade slidable between a first blade covering position a first blade retract position; and a second blade pivotally supported by the first blade and movable between a second blade covering position and a second blade retract position, wherein the first blade does not rotate but linearly slides to and between the first blade covering position and the first blade retract position and, as the first blade moves from the first blade retract position to the first blade covering position, the second blade moves linearly with the first blade and pivots relative to the first blade to move from the second blade retract position to the second blade covering position.

9. The imaging apparatus according to claim 1, wherein, the first and second blades overlap each other in both the respective first and second blade retract positions and the respective first and second blade covering positions, the first blade and second blade overlap one another more in the respective first and second blade retract positions than in the respective first and second blade covering positions.

10. An imaging apparatus comprising:

a lens;

a first blade slidable between a first blade covering position where the first blade covers a portion of a front side of the lens and a first blade retract position where the first blade retracts from the first portion of the front side of the lens to uncover the portion of the front side of the lens; and a second blade pivotally supported by the first blade and movable between a second blade covering position where the second blade covers a remaining portion of the front side of the lens and a second blade retract position where the second blade retracts from the remaining portion of the front side of the lens to uncover the remaining portion of the front side of the lens, wherein, the first blade and the second blade overlap one another in both the respective first and second blade retract positions and the respective first and second blade covering positions, and, the first blade and second blade overlap one another more in the respective first and second blade retract positions than in the respective first and second blade covering positions.

11. An open/close device comprising:
a first blade slidable between a first blade covering position a first blade retract position; and
a second blade pivotally supported by the first blade and movable between a second blade covering position and a second blade retract position,
wherein the first blade does not rotate but linearly slides to and between the first blade covering position and the first blade retract position, the first blade and the second blade overlap one another in both the respective first and second blade retract positions and the respective first and second blade covering positions, and, the first blade and second blade overlap one another more in the respective first and second blade retract positions than in the respective first and second blade covering positions.

* * * * *